United States Patent
Cui et al.

(10) Patent No.: US 12,452,523 B2
(45) Date of Patent: Oct. 21, 2025

(54) PHOTOGRAPHING METHOD AND ELECTRONIC DEVICE

(71) Applicant: Huawei Technologies Co., Ltd., Shenzhen (CN)

(72) Inventors: Hantao Cui, Shenzhen (CN); Wei Ji, Shenzhen (CN); Guangyuan Li, Shenzhen (CN); Gang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 223 days.

(21) Appl. No.: 18/253,551

(22) PCT Filed: Nov. 23, 2021

(86) PCT No.: PCT/CN2021/132388
§ 371 (c)(1),
(2) Date: May 18, 2023

(87) PCT Pub. No.: WO2022/105928
PCT Pub. Date: May 27, 2022

(65) Prior Publication Data
US 2023/0421889 A1    Dec. 28, 2023

(30) Foreign Application Priority Data
Nov. 23, 2020 (CN) .......................... 202011324015.5

(51) Int. Cl.
*H04N 23/63* (2023.01)
*H04N 13/239* (2018.01)
*H04N 23/68* (2023.01)

(52) U.S. Cl.
CPC ......... *H04N 23/632* (2023.01); *H04N 13/239* (2018.05); *H04N 23/687* (2023.01)

(58) Field of Classification Search
CPC .. H04N 23/632; H04N 23/635; H04N 23/683; H04N 23/69; H04N 23/60;
(Continued)

(56) References Cited

U.S. PATENT DOCUMENTS

| 2009/0010535 A1 | 1/2009 | Koishi |
| 2012/0057039 A1 | 3/2012 | Gardiner et al. |

(Continued)

FOREIGN PATENT DOCUMENTS

| CN | 101902572 A | 12/2010 |
| CN | 107454303 A | 12/2017 |

(Continued)

*Primary Examiner* — Lin Ye
*Assistant Examiner* — Tuan H Le
(74) *Attorney, Agent, or Firm* — Slater Matsil, LLP

(57) ABSTRACT

In accordance with an embodiment, a method of operating an electronic device comprising a screen, a first camera, and a second camera, includes: detecting that a zoom ratio gradually changes within a first ratio range, wherein the zoom ratio in the first ratio range is less than an optical zoom ratio of the second camera, and a ratio difference between the zoom ratio within the first ratio range and the optical zoom ratio of the second camera is less than a first value; cropping an image captured by the first camera to obtain a preview image whose field of view (FOV) size gradually changes; and displaying on the screen, the preview image whose FOV size gradually changes.

22 Claims, 30 Drawing Sheets

(58) Field of Classification Search
CPC ...... H04N 23/61; H04N 23/62; H04N 23/631; H04N 23/64; H04N 23/67; H04N 23/80; H04N 13/239; H04N 23/687; H04N 23/45; H04N 23/90; H04N 23/55
See application file for complete search history.

(56) References Cited

U.S. PATENT DOCUMENTS

| | | | |
|---|---|---|---|
| 2012/0300051 A1* | 11/2012 | Daigo | H04N 23/631 |
| | | | 348/E5.022 |
| 2018/0069983 A1* | 3/2018 | Cho | H04N 23/632 |
| 2018/0109710 A1 | 4/2018 | Lee et al. | |
| 2019/0045135 A1* | 2/2019 | Ryu | H04N 23/635 |
| 2019/0068886 A1 | 2/2019 | Baek et al. | |
| 2022/0417416 A1* | 12/2022 | Li | H04N 23/635 |

FOREIGN PATENT DOCUMENTS

| | | | |
|---|---|---|---|
| CN | 107483808 A | 12/2017 | |
| CN | 108881703 A | 11/2018 | |
| CN | 110493525 A | 11/2019 | |
| CN | 110536057 A | 12/2019 | |
| CN | 110784651 A | 2/2020 | |
| CN | 110913122 A | 3/2020 | |
| CN | 111510618 A | 8/2020 | |
| CN | 111641775 A | 9/2020 | |
| CN | 111885305 A | 11/2020 | |
| CN | 111917941 A | 11/2020 | |
| CN | 111935397 A | 11/2020 | |
| CN | 111935398 A | 11/2020 | |
| JP | 2005198155 A | 7/2005 | |

\* cited by examiner

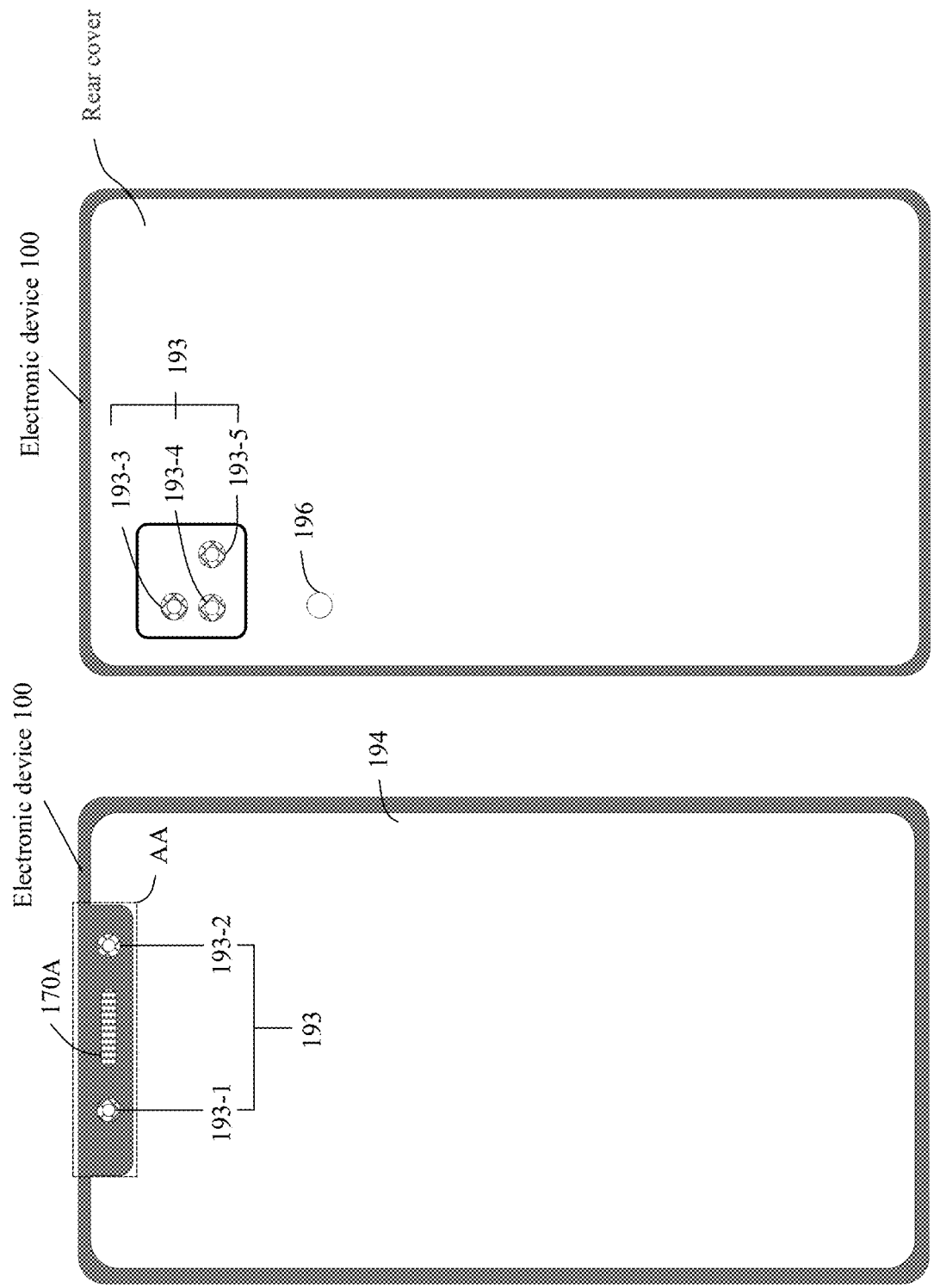

PHOTOGRAPHING METHOD AND ELECTRONIC DEVICE

CROSS-REFERENCE TO RELATED APPLICATIONS

This application is a national stage of International Application No. PCT/CN2021/132388, filed on Nov. 23, 2021, which claims priority to Chinese Patent Application No. 202011324015.5, filed on Nov. 23, 2020. Both of the aforementioned applications are hereby incorporated by reference in their entireties.

TECHNICAL FIELD

This application relates to the field of terminal technologies, and in particular, to a photographing method and an electronic device.

BACKGROUND

With development of electronic technologies, increasingly more cameras are disposed on an electronic device such as a mobile phone or a tablet computer, to implement zoom photographing in a larger ratio range (for example, ratios ranging from 0.8× to 20×), thereby meeting various photographing requirements of a user. However, currently, a problem of a field of view (field of view, FOV) center jump occurs in a zoom process.

SUMMARY

This application aims to provide a photographing method and an electronic device, to avoid an FOV center jump in a zoom photographing process, and implement a smooth FOV transition.

According to a first aspect, this application provides a photographing method, which may be applied to an electronic device including a screen, a first camera, and a second camera. Optical centers of the first camera and the second camera do not overlap, and a focal length of the first camera is less than a focal length of the second camera. The method may include: The electronic device may detect that a zoom ratio gradually changes in a first ratio range, where the zoom ratio in the first ratio range is less than an optical zoom ratio of the second camera, and a ratio difference between the zoom ratio in the first ratio range and the optical zoom ratio of the second camera is less than a first value. In this case, the electronic device may display, on the screen, a preview image whose field of view FOV size gradually changes, where the preview image whose FOV size gradually changes is obtained by cropping an image captured by the first camera, and an FOV center of the preview image whose FOV size gradually changes gradually approaches or gets away from an FOV center of the second camera.

The first camera may be an ordinary camera, and an optical zoom ratio of the ordinary camera may be 1×. The second camera may be a long-focus camera, and an optical zoom ratio of the long-focus camera may be 5×. The first ratio range may be 4.6× to 4.9×, that is, near a zoom ratio for camera switching.

In this way, when the zoom ratio gradually changes between 4.6× and 4.9×, an image captured by the ordinary camera may be cropped, so that an FOV size of a cropped preview image gradually changes, and an FOV center of the preview image gradually approaches or gets away from an FOV center of the long-focus camera.

With reference to the first aspect, in some embodiments, in the first ratio range, a larger zoom ratio leads to a smaller FOV of the preview image, and indicates that the FOV center of the preview image is closer to the FOV center of the second camera; and in the first ratio range, a smaller zoom ratio leads to a larger FOV of the preview image, and indicates that the FOV center of the preview image is farther away from the FOV center of the second camera.

With reference to the first aspect, in some embodiments, that the zoom ratio changes in the first ratio range may be that the zoom ratio gradually increases in the first ratio range. The electronic device may display, on the screen, a preview image whose field of view FOV gradually decreases, where an FOV center of the preview image whose FOV gradually decreases gradually approaches the FOV center of the second camera.

That is, when the zoom ratio gradually increases between 4.6× and 4.9×, an FOV size of the preview image gradually decreases, and the FOV center of the preview image gradually approaches the FOV center of the long-focus camera.

With reference to the first aspect, in some embodiments, the electronic device may display a preview image of a first FOV on the screen before detecting that the zoom ratio gradually changes in the first ratio range, where the preview image of the first FOV is from the first camera, and a center of the first FOV may be consistent with an FOV center of the first camera.

That is, when the zoom ratio is less than 4.6×, the preview image of the first FOV displayed on the screen may be an image obtained by performing center cropping on an image captured by the ordinary camera.

With reference to the first aspect, in some embodiments, when detecting that the zoom ratio increases to be greater than the optical zoom ratio of the second camera, the electronic device displays a preview image of a second FOV on the screen, where the preview image of the second FOV is from the second camera, and a center of the second FOV may be consistent with the FOV center of the second camera.

That is, when the zoom ratio is 5×, an image displayed on the screen, that is, the preview image of the second FOV, may be an image captured by the long-focus camera.

In this case, in a process of increasing the zoom ratio, when the zoom ratio is less than 4.6×, the FOV center of the preview image is an FOV center of the ordinary camera; when the zoom ratio is increased between 4.6× and 4.9×, the FOV center of the preview image gradually approaches the FOV center of the long-focus camera; and when the zoom ratio is 5×, the FOV center of the preview image is the FOV center of the long-focus camera. It can be learned that, in a process of changing from the FOV center of the ordinary camera to the FOV center of the long-focus camera, the FOV center of the preview image further undergoes a process of gradually approaching the FOV center of the long-focus camera, thereby avoiding a direct jump from the FOV center of the ordinary camera to the FOV center of the long-focus camera, and implementing a smooth transition of the FOV center.

With reference to the first aspect, in some embodiments, that the zoom ratio changes in the first ratio range may be that the zoom ratio gradually decreases in the first ratio range. The electronic device may display, on the screen, a preview image whose field of view FOV gradually increases, where an FOV center of the preview image whose FOV gradually increases gradually gets away from the FOV center of the second camera.

That is, when the zoom ratio gradually decreases between 4.6× and 4.9×, an FOV size of the preview image gradually increases, and the FOV center of the preview image gradually gets away from the FOV center of the long-focus camera.

With reference to the first aspect, in some embodiments, the electronic device may display a preview image of a third FOV on the screen before detecting that the zoom ratio gradually changes in the first ratio range, where the preview image of the third FOV is from the second camera, and a center of the third FOV may be consistent with an FOV center of the second camera.

That is, when the zoom ratio is 5×, an image displayed on the screen, that is, the preview image of the third FOV, may be an image captured by the long-focus camera.

With reference to the first aspect, in some embodiments, when detecting that the zoom ratio decreases to be less than a minimum ratio in the first ratio range, the electronic device may display a preview image of a fourth FOV on the screen, where the preview image of the fourth FOV is from the first camera, and a center of the fourth FOV may be consistent with the FOV center of the first camera.

That is, when the zoom ratio is less than 4.6×, the preview image of the fourth FOV displayed on the screen may be an image captured by the ordinary camera, or an image obtained by performing center cropping on an image captured by the ordinary camera.

In this case, in a process of decreasing the zoom ratio, when the zoom ratio is 5×, the FOV center of the preview image is the FOV center of the long-focus camera; when the zoom ratio is decreased between 4.6× and 4.9×, the FOV center of the preview image gradually gets away from the FOV center of the long-focus camera; and when the zoom ratio is less than 4.6×, the FOV center of the preview image is the FOV center of the ordinary camera. It can be learned that, in a process of changing from the FOV center of the long-focus camera to the FOV center of the ordinary camera, the FOV center of the preview image further undergoes a process of gradually getting away from the FOV center of the long-focus camera, thereby avoiding a direct jump from the FOV center of the ordinary camera to the FOV center of the long-focus camera, and implementing a smooth transition of the FOV center.

With reference to the first aspect, in some embodiments, in the first ratio range, a position of a cropping area for cropping the image captured by the first camera may be determined based on the zoom ratio R, an imaging deviation offset at a first distance, and an eccentric factor α at the zoom ratio. The first distance is a detected distance between the electronic device and a scene, the imaging deviation R at the first distance includes a first deviation total_x and a second deviation total_y, and the first deviation total_x and the second deviation total_y are respectively deviations of a center of the image captured by the first camera relative to a center of an image captured by the second camera in an X-axis direction and a Y-axis direction of an image coordinate system. In addition, in the first ratio range, a larger zoom ratio R leads to a larger eccentric factor α, and a smaller zoom ratio R leads to a smaller eccentric factor α. The eccentric factor α is greater than 0 and less than 1.

The first distance is an object distance, and may be obtained by using a laser sensor or a focus motor of the electronic device. The imaging deviation offset may be obtained through camera calibration. When the zoom ratio is 4.6×, 4.7×, 4.8×, and 4.9×, eccentric factors α may be respectively ¼, ½, ¾, and 1.

With reference to the first aspect, in some embodiments, on a plane of the image captured by the first camera, an X-coordinate value and a Y-coordinate value of an upper-left corner of the cropping area are determined as follows:

$X\text{-coordinate value}=(1-1/R)*w/2+\text{total\_}x*\alpha;$ and $Y\text{-coordinate value}=(1-1/R)*h/2+\text{total\_}y*\alpha,$ where w and h are respectively a width and a height of the image captured by the first camera.

That is, when the zoom ratio gradually changes in a range of 4.6× to 4.9×, based on an upper-left corner position of the cropping area, eccentric cropping may be performed on an image captured by the ordinary camera, to gradually change the FOV center of the preview image, so that the FOV center of the preview image gradually gets away from or approaches the FOV center of the long-focus camera.

With reference to the first aspect, in some embodiments, in the first ratio range, the electronic device may drive, by using a motor of an optical image stabilization OIS system, a lens of the second camera to move or a lens of the first camera to move. An offset between an optical center of the second camera and an optical center of the first camera gradually increases or decreases as the lens moves, and the offset is less than an initial offset between the optical centers of the first camera and the second camera. In the first ratio range, a smaller zoom ratio leads to a larger offset, and a larger zoom ratio leads to a smaller offset.

That is, the motor of the optical image stabilization OIS system is used to move the lens of the camera, to change the offset between the optical centers of the two cameras, so that an FOV center jump in a zoom process can also be reduced.

With reference to the first aspect, in some embodiments, that the zoom ratio changes in the first ratio range may be that the zoom ratio gradually increases in the first ratio range. The electronic device may drive, by using the motor of the OIS, the lens of the second camera to move in a direction that is perpendicular to an optical axis and toward the first camera, and/or the electronic device may drive, by using the motor of the OIS, the lens of the first camera to move in a direction that is perpendicular to the optical axis and toward the second camera, where the offset between the optical center of the second camera and the optical center of the first camera gradually decreases with the movement.

That is, in a process of increasing the zoom ratio, the electronic device drives the lens of the camera by using the motor of the OIS, so that the offset between the optical centers of the two cameras gradually decreases from the initial offset, that is, the optical centers of the two cameras gradually approach each other, thereby reducing an FOV center jump.

With reference to the first aspect, in some embodiments, that the zoom ratio changes in the first ratio range may be that the zoom ratio gradually decreases in the first ratio range. The electronic device may drive, by using the motor of the OIS, the lens of the second camera to move in a direction that is perpendicular to the optical axis and away from the first camera, and/or the electronic device may drive, by using the motor of the OIS, the lens of the first camera to move in a direction that is perpendicular to the optical axis and away from the second camera, where the offset between the optical center of the second camera and the optical center of the first camera gradually increases with the movement.

That is, in a process of decreasing the zoom ratio, the electronic device drives the lens of the camera by using the motor of the OIS, so that the offset between the optical centers of the two cameras gradually increases to the initial offset, that is, the optical centers of the two cameras gradually get away from each other, thereby reducing an FOV center jump.

According to a second aspect, this application provides an electronic device. The electronic device includes a screen, a first camera, a second camera, a memory, a processor coupled to the memory, a plurality of applications, and one or more programs. Optical centers of the first camera and the second camera do not overlap, a focal length of the first camera is less than a focal length of the second camera, and when the processor executes the one or more programs, the electronic device is enabled to perform the method described in any one of the first aspect or the implementations of the first aspect.

According to a third aspect, this application provides a computer device. The computer device includes a memory, a processor, and a computer program that is stored in the memory and that can be run on the processor. When the processor executes the computer program, the computer device is enabled to perform the method described in any one of the first aspect or the implementations of the first aspect.

According to a fourth aspect, this application provides a computer-readable storage medium. The computer-readable storage medium may include instructions. When the instructions are run on an electronic device, the electronic device is enabled to perform the method described in any one of the first aspect or the implementations of the first aspect.

According to the technical solutions provided in this application, near a zoom ratio for camera switching, the electronic device may perform eccentric cropping on an image captured by a camera having a larger FOV, so that an FOV center of an image obtained through cropping gradually approaches or gets away from an FOV center of a camera having a smaller FOV. Alternatively, the motor of the OIS is used to drive a lens in the camera to move, to change a distance between optical centers of the two cameras, thereby implementing a smooth FOV transition. In this way, more continuous and consistent framing is provided for a user, and photographing experience is improved.

BRIEF DESCRIPTION OF THE DRAWINGS

FIG. 2A and FIG. 2B show schematic diagrams of an outline structure of an electronic device according to an embodiment of this application;

DETAILED DESCRIPTION OF ILLUSTRATIVE EMBODIMENTS

Figure 1:
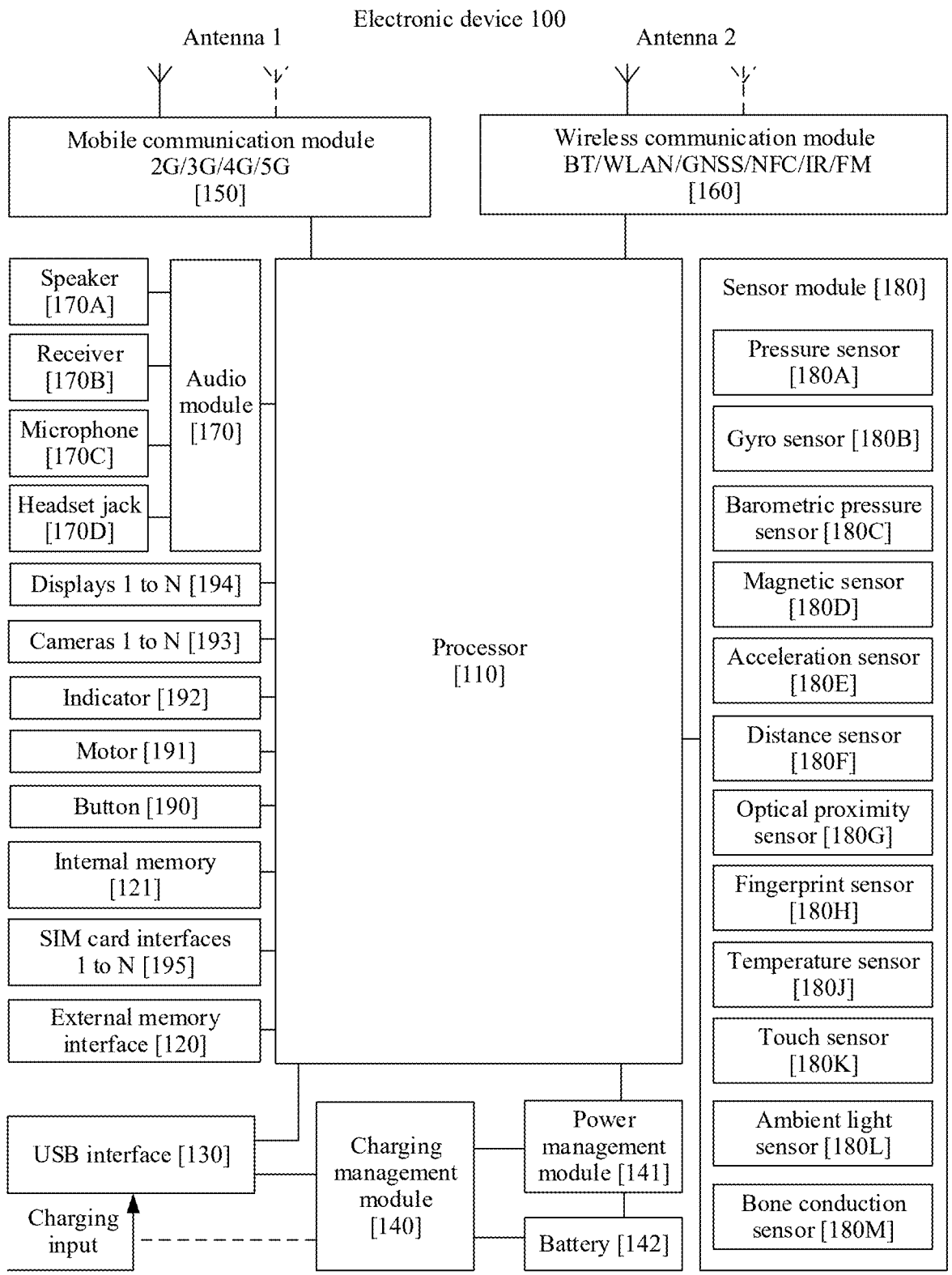
FIG. 1 shows a schematic diagram of a structure of an electronic device according to an embodiment of this application.

Terms used in the following embodiments of this application are merely intended to describe specific embodiments, but are not intended to limit this application.

Embodiments of this application provide a photographing method, to avoid a field of view (field of view, FOV) center jump in a zoom photographing process, thereby providing more continuous and consistent framing for a user, and improving photographing experience.

The photographing method provided in embodiments of this application may be applied to an electronic device having a plurality of cameras having different focal lengths. The plurality of cameras may be an ordinary camera, a long-focus camera, a wide-angle camera, and the like. Because positions of the plurality of cameras on the electronic device are different, optical centers of the plurality of cameras do not overlap. Consequently, FOV centers of the plurality of cameras are inconsistent. It is assumed that a zoom ratio of the ordinary camera is a ratio of 1× (represented as 1×), a zoom ratio of the long-focus camera is a ratio of 5× that is represented as 5× (X subsequently represents a zoom ratio), and a zoom ratio of the wide-angle camera is 0.7×. Generally, because the optical centers of the plurality of cameras do not overlap, an FOV center jump occurs in an optical zoom process including camera switching. For example, in a process of switching from the ordinary camera to the long-focus camera, a center point of photographing falls at an obviously different position, affecting focusing of the user.

According to the photographing method provided in embodiments of this application, a problem of an FOV center jump in an optical zoom process can be resolved. Near a zoom ratio for camera switching, the electronic device may perform incremental eccentric cropping on an image shot by a camera having a larger FOV, so that an FOV center of an image obtained through cropping gradually approaches or gets away from an FOV center of a camera having a smaller FOV, thereby implementing a smooth FOV transition and avoiding an FOV center jump. Herein, the camera having a larger FOV and the camera having a smaller FOV are two cameras related to one time of camera switching, for example, switching from the ordinary camera to the long-focus camera or switching from the long-focus camera to the ordinary camera. The incremental eccentric cropping herein is a general description, and mainly refers to: In a zoom process, as a zoom ratio continuously approaches the zoom ratio for camera switching, an image shot by the camera having a larger FOV is successively cropped for a plurality of times, so that an FOV center of an image obtained through each time of cropping gradually approaches or gets away from the FOV center of the camera having a smaller FOV. Implementation of the incremental eccentric cropping is described in detail in the following content, and details are not described herein.

It is assumed that when the zoom ratio is increased, the zoom ratio for camera switching is 4.9× to 5×, and the camera switching is specifically switching from the ordinary camera to the long-focus camera. When the zoom ratio is close to 5×, for example, at 4.6×, 4.7×, 4.8×, and 4.9×, the electronic device may perform incremental eccentric cropping, so that FOV centers of images obtained through cropping at 4.6×, 4.7×, 4.8×, and 4.9× gradually approach an FOV center of the long-focus camera, and an FOV center of an image obtained through cropping at 4.9× may even overlap the FOV center of the long-focus camera, thereby avoiding an FOV center jump. When the zoom ratio is decreased, the zoom ratio for camera switching is 5× to 4.9×, and the camera switching is specifically switching from the long-focus camera to the ordinary camera.

In this way, when the user increases the zoom ratio (for example, from X to 5×) to achieve a purpose of observing a distant scene in detail, the photographing method provided in embodiments of this application helps the user "lock" a target scene in a zoom process, to avoid a case in which the user "loses" the target scene due to camera switching, and avoid repeated framing and focusing of the user, thereby improving efficiency and convenience of zoom photographing. Herein, only an example of increasing a zoom ratio is used. The photographing method provided in embodiments of this application is also applicable to a use scenario of decreasing a zoom ratio (for example, switching from the ordinary camera to the wide-angle camera).

The electronic device may be a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or a dedicated camera (for example, a single-lens reflex camera or a card camera). A specific type of the electronic device is not limited in this application.

FIG. 1 shows an example of a structure of the electronic device. As shown in FIG. 1, the electronic device 100 may have a plurality of cameras 193, for example, an ordinary camera, a wide-angle camera, an ultra-wide-angle camera, and a long-focus camera. A smaller focal length of the camera 193 leads to a larger angle of view and a larger framing range of the camera 193, and indicates that more scenes may be photographed. On the contrary, a larger focal length of the camera 193 leads to a smaller angle of view and a smaller framing range of the camera 193, and indicates that fewer but farther scenes may be photographed. For example, a focal length of the ultra-wide-angle camera is generally about 12 millimeters (millimeters, mm) to 24 mm, and an angle of view of the ultra-wide-angle camera is generally 84° to 120°; a focal length of the wide-angle camera is generally about 24 mm to 35 mm, and an angle of view of the wide-angle camera is generally 63° to 84°; a focal length of the ordinary camera is generally about 50 mm, and an angle of view of the ordinary camera is generally about 46°; a focal length of the long-focus camera is generally about 135 mm to 500 mm, and an angle of view of the long-focus camera is generally 5° to 18°; and a focal length of an ultra-long-focus camera is generally greater than 500 mm, and an angle of view of the ultra-long-focus camera is generally 0° to 5° For performance of three types of cameras in terms of angle of view, the ultra-wide-angle camera is better than the wide-angle camera, and the wide-angle camera is better than the ordinary camera.

In addition, because positions of the plurality of cameras on the electronic device are different, optical centers of the plurality of cameras do not overlap. Consequently, FOV centers of the plurality of cameras are inconsistent. It is assumed that a zoom ratio of the ordinary camera is 1×, a zoom ratio of the long-focus camera is 5×, and a zoom ratio of the wide-angle camera is 0.7×. Generally, because the optical centers of the plurality of cameras do not overlap, an FOV center jump occurs in an optical zoom process including camera switching. For example, in a process of switching from the ordinary camera to the long-focus camera, a center point of photographing falls at an obviously different position, affecting focusing of the user.

An optical center of a camera may be changed through optical image stabilization (Optical image stabilization, OIS). The OIS may use a motor to drive a lens to move, to change the optical center of the camera, thereby changing an FOV center of the camera.

In addition, the electronic device 100 may further include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a display 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The power management module 141 is configured to connect the battery 142 and the charging management module 140 to the processor 110. In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. The mobile communication module 150 may provide a wireless communication solution that is applied to the electronic device 100 and that includes 2G/3G/4G/5G or the like. The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology.

The wireless communication technology mentioned above may include a technology such as a Global System for Mobile Communications (global system for mobile communications, GSM), a general packet radio service (general packet radio service, GPRS), Code Division Multiple Access (code division multiple access, CDMA), Wideband Code Division Multiple Access (wideband code division multiple access, WCDMA), Time-Division Code Division Multiple Access (time-division code division multiple access, TD-SCDMA), Long Term Evolution (long term evolution, LTE), BT, GNSS, WLAN, NFC, FM, and/or IR. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The external memory interface 120 may be configured to connect to an external storage card, for example, a micro SD card, to extend a storage capability of the electronic device 100. The internal memory 121 may be configured to store computer-executable program code, and the executable program code includes instructions. The processor 110 runs the instructions stored in the internal memory 121, to perform various functional applications of the electronic device 100 and data processing. The internal memory 121 may include a program storage area and a data storage area.

The electronic device 100 may implement an audio function, for example, music playing and recording, by using the audio module 170, the speaker 170A, the receiver 170B, the microphone 170C, the headset jack 170D, the application processor, and the like. The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. The gyro sensor 180B may be configured to determine a motion posture of the electronic device 100, for example, angular velocities of the electronic device 100 around three axes (that is, x, y, and z axes). The barometric pressure sensor 180C is configured to measure barometric pressure. The magnetic sensor 180D includes a Hall sensor. The acceleration sensor 180E may detect accelerations in various directions (usually on three axes) of the electronic device 100. The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 constitute a touchscreen, which is also referred to as a "touch screen". The bone conduction sensor 180M may obtain a vibration signal.

The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

The electronic device 100 may implement a photographing function by using the image processor (Image Signal Processor, ISP), the camera 193, the video codec, the GPU, the display 194, the application processor, and the like.

The ISP is configured to process data fed back by the camera 193. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. Not limited to being integrated into the processor 110, the ISP may also be disposed in the camera 193.

The camera 193 includes a lens and a photosensitive element (which may also be referred to as an image sensor), and is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal, for example, an image signal in a standard RGB or YUV format.

In some embodiments, the camera 193 may be configured to collect depth data. For example, the camera 193 may have a time of flight (TOF) 3D sensing module or a structured light (structured light) 3D sensing module, configured to obtain depth information. The camera configured to collect depth data may be a front-facing camera, or may be a rear-facing camera.

The video codec is configured to compress or decompress a digital image. The electronic device 100 may support one or more image codecs. In this way, the electronic device 100 may open or store pictures or videos in a plurality of encoding formats.

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like, for example, an image captured by the camera 193. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), and the like. In some embodiments, the electronic device 100 may include one or more displays 194.

FIG. 2A and FIG. 2B show schematic diagrams of an outline structure of an electronic device 100. FIG. 2A shows a surface on which a display 194 of the electronic device 100 is located. FIG. 2B shows a surface on which a rear cover of the electronic device 100 is located.

The electronic device 100 may have a plurality of cameras 193. The electronic device 100 may include a plurality of front-facing cameras. As shown in FIG. 2A, a front-facing camera 193-1 and a front-facing camera 193-2 may be disposed at the top of the electronic device 100, for example, at a "bangs" position (that is, an area AA shown in FIG. 2A) of the electronic device 100. In addition to the cameras 193, the area AA may further include a speaker 170A and the like. As shown in FIG. 2B, the electronic device 100 may include a plurality of rear-facing cameras, for example, a rear-facing camera 193-3, a rear-facing camera 193-4, and a rear-facing camera 193-5. The rear-facing camera 193-3, the rear-facing camera 193-4, and the rear-facing camera 193-5 may be respectively an ordinary camera, a wide-angle camera, and a long-focus camera. A flash 196 and the like may be further disposed near the cameras 193.

The cameras 193 may change an angle of view of a preview image in a preview box by using digital zoom, or may change an angle of view of a preview image in a preview box by using optical zoom, or may change an angle of view of a preview image by using a combination of optical zoom and digital zoom (also referred to as hybrid zoom). In other words, zooming may include digital zoom, optical zoom, or hybrid zoom. The following uses hybrid zoom as an example.

The electronic device 100 may change a camera used for photographing in the plurality of cameras 193 and use digital zoom, to enable sizes of preview angles presented by a series of images displayed in the preview box to gradually change. The camera used for photographing may be a camera whose captured image is displayed in the preview box. The digital zoom may be that the electronic device 100 increases an area of each pixel in an image captured by the camera 193, to achieve a purpose of changing a focal length. This is equivalent to that the electronic device 100 crops an image captured by a camera, and then enlarges a cropped image, that is, adjusts resolution of the cropped image to be the same as resolution of the image before cropping. In this way, compared with the image before cropping, an area of each pixel in the cropped image that is enlarged increases. In addition, an image in a part of an angle of view is cut off, so that a preview angle presented by the cropped image that is enlarged decreases. This is similar to an effect of increasing a focal length. However, actually, the digital zoom does not change a focal length of the camera.

It is assumed that an image captured by the ordinary camera 193-3 is currently displayed in the preview box, and a current zoom ratio is 1×. When the electronic device 100 detects an operation of increasing the zoom ratio, the electronic device 100 may first crop the image shot by the ordinary camera 193-3, and cropping in this phase may be center cropping. When the zoom ratio is continuously increased to be close to a zoom ratio (for example, 4.9× to 5×) for camera switching, the electronic device may perform incremental eccentric cropping on the image shot by the ordinary camera 193-3, so that an FOV center of an image obtained through cropping gradually approaches an FOV center of the long-focus camera 193-5, and the FOV center changes more smoothly, instead of suddenly jumping to the FOV center of the long-focus camera 193-5. That is, the electronic device 100 performs digital zoom for a plurality of times on the image shot by the ordinary camera 193-3. When an increased zoom ratio reaches a zoom ratio (for example, 5×) of the long-focus camera 193-5, the electronic device 100 switches to the long-focus camera 193-5, and an image displayed in the preview box becomes an image captured by the long-focus camera 193-5, that is, the electronic device 100 performs optical zoom. In other words, when the zoom ratio is continuously increased, image displaying may successively include two phases: a phase in which the ordinary camera 193-3 is used to capture an image, and a phase in which the long-focus camera 193-5 is used to capture an image. In the phase in which the ordinary camera 193-3 is used to capture an image, the zoom ratio gradually increases from 1×. For example, the zoom ratio increases from X to 1.5×, from 1.5× to 4×, and from 4× to 4.9×. When the ratio increases to 5×, the electronic device 100 switches to the phase in which the long-focus camera 193-5 is used to capture an image.

It is assumed that an image captured by the long-focus camera 193-5 is currently displayed in the preview box, and a current zoom ratio is 5× or higher. When the electronic device 100 detects an operation of decreasing the zoom ratio, the electronic device 100 may decrease the zoom ratio. Then, an image displayed in the preview box becomes an image captured by the ordinary camera 193-3. When the zoom ratio is just decreased, a decreased zoom ratio is close to 5×, for example, 4.9×, 4.8×, or 4.7×. The electronic device 100 may first perform incremental eccentric cropping on the image shot by the ordinary camera 193-3, so that an FOV center of an image obtained through cropping gradually gets away from the FOV center of the long-focus camera 193-5, and the FOV center changes more smoothly, instead of suddenly jumping to an FOV center of the ordinary camera 193-3. As the zoom ratio continues to decrease, before the zoom ratio decreases to 1×, the electronic device 100 may continue to crop the image shot by the ordinary camera 193-3, and cropping in this phase may be center cropping. In other words, when the zoom ratio is continuously decreased, image displaying may successively include two phases: a phase in which the long-focus camera 193-5 is used to capture an image, and a phase in which the ordinary camera 193-3 is used to capture an image. When the zoom ratio is 5× or higher, an image displayed in the preview box is from the long-focus camera 193-5. When the zoom ratio decreases to 4.9× to 1×, an image displayed in the preview box is from the ordinary camera 193-3.

In other words, incremental eccentric cropping may be performed near the zoom ratio for camera switching. For example, the electronic device 100 performs incremental eccentric cropping at zoom ratios close to 5×, such as 4.6×, 4.7×, 4.8×, and 4.9×. 4.9× to 5× may be a zoom ratio at which switching between the ordinary camera 193-3 and the long-focus camera 193-5 occurs. The incremental eccentric cropping mentioned above may alternatively be performed from the beginning of zooming. For example, the electronic device 100 performs incremental eccentric cropping in a whole digital zoom process from 1× to 1.5×, 2×, . . . , and 4.9×.

When a camera is used to capture an image, an FOV presented by an image that is from the camera and that is displayed in the preview box may be generally less than an FOV of the camera. In this case, the image in the preview box is obtained by cropping an image captured by the camera. When the zoom ratio is changed to a specific ratio, the FOV presented by the image displayed in the preview box may be equal to the FOV of the camera. For example, in the phase (that is, 1× to 4.9×) in which the ordinary camera 193-3 is used to capture an image, an FOV presented by an image displayed in the preview box is generally less than an FOV of the ordinary camera 193-3. Even when the zoom ratio is 1×, the FOV presented by the image displayed in the preview box may be less than the FOV of the ordinary camera 193-3.

Not limited to FIG. 1, the electronic device 100 may alternatively include more or fewer components. For example, the electronic device 100 may be a large-screen device such as a smart TV or a smart screen, and a camera 193 may be disposed on the large-screen device. In a zoom photographing scenario, near a zoom ratio for camera switching, such a large-screen device may perform incremental eccentric cropping on an image shot by a currently used camera, so that an FOV center of an image obtained through cropping gradually approaches an FOV center of a camera to be used later, thereby implementing a smooth FOV transition and avoiding an FOV center jump. How to perform incremental eccentric cropping is described in detail in subsequent embodiments, and is not described herein.

The following describes a typical photographing scenario in this application.

Figure 3A:
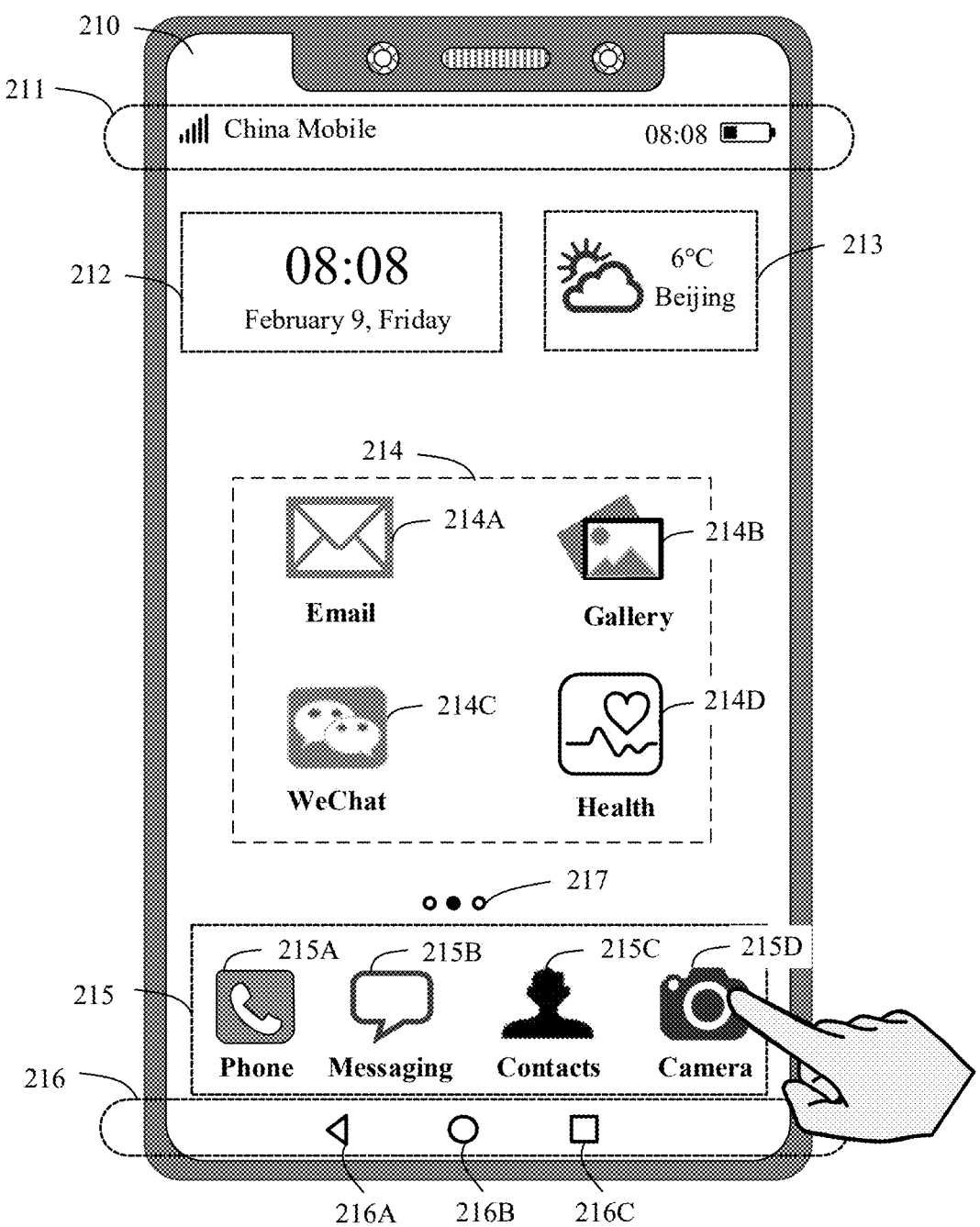
FIG. 3A and FIG. 3B show user interfaces of a typical photographing scenario according to an embodiment of this application.
Figure 3B:
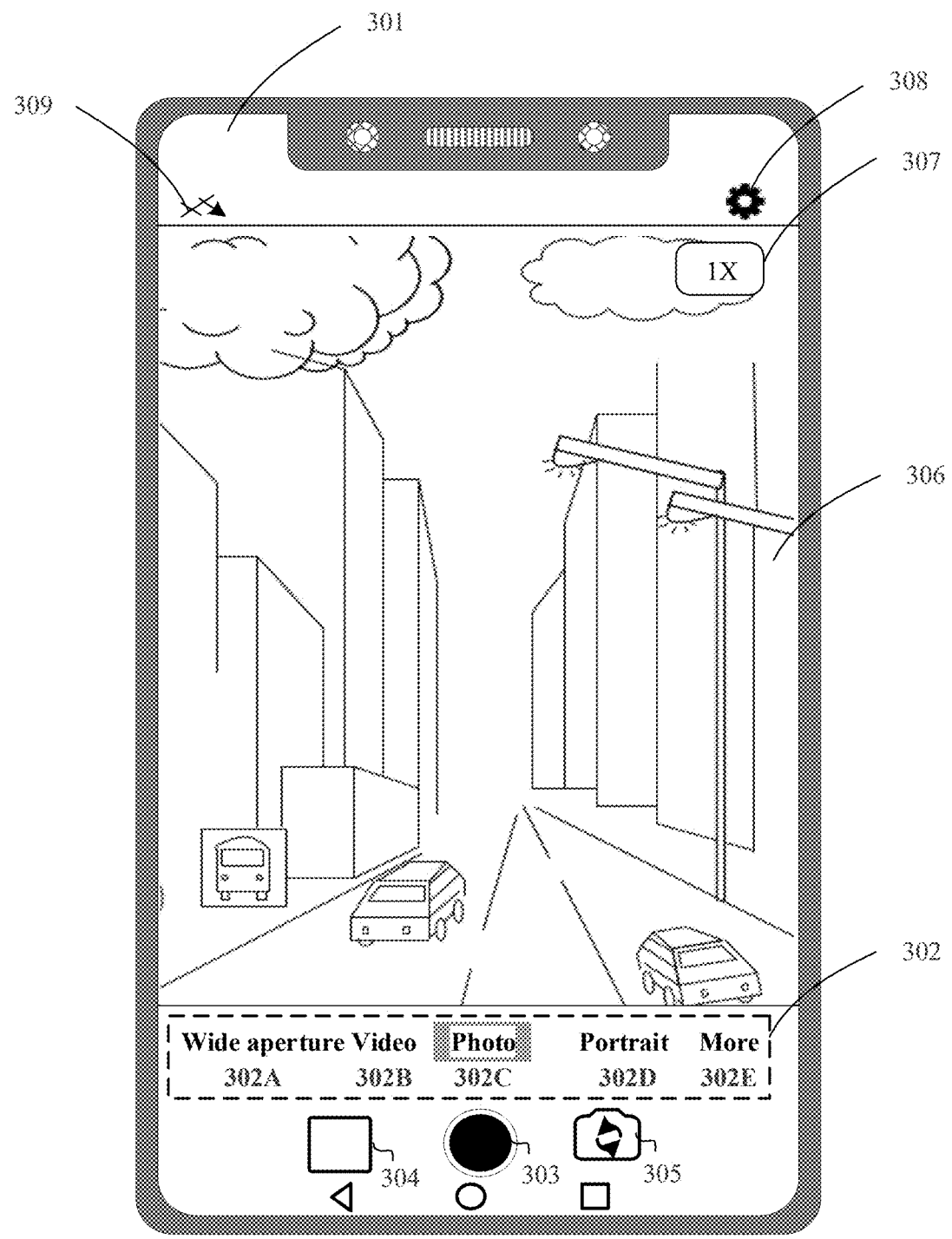

As shown in FIG. 3A and FIG. 3B, an electronic device may detect an operation of opening a "Camera" application, for example, an operation of tapping a camera icon 215D on a home screen (Home screen) shown in FIG. 3A. In response to the operation, the electronic device may display a user interface 301 shown in FIG. 3B as an example, that is, a user interface of the "Camera" application. The home screen shown in FIG. 3A may include a status bar 211, a tray 215 including a list of commonly used applications, a calendar indicator 212, a weather indicator 213, a navigation bar 216, other application icons 214, and the like. "Camera" is an image shooting application on an electronic device such as a smartphone or a tablet computer. A name of the application is not limited in this application. Not limited to FIG. 3A and FIG. 3B, a user may alternatively open the user interface 301 in another application. For example, the user taps a photographing control in "WeChat" to open the user interface 301. "WeChat" is a social application that allows the user to share a shot photo or the like with others.

The user interface 301 may be a user interface of a default photographing mode of the "Camera" application. The default photographing mode may be a default photographing mode of an ordinary rear camera, or may be another photographing mode. This is not limited herein. As shown in FIG. 3B, the user interface 301 may include a setting control 308, a flash control 309, a zoom ratio 307, a preview box 306, a camera mode option 302, a gallery shortcut control 304, a shutter control 303, and a camera flipping control 305.

The setting control 308 may be used to adjust a parameter (for example, resolution or a filter) for shooting a photo, enable or disable some photographing manners (for example, scheduled photographing, smile shot, and voice control photographing), and so on. The setting control 308 may be used to set more other photographing functions. This is not limited in this embodiment of this application.

The flash control 309 may be used to turn on or turn off a flash.

The zoom ratio 307 may be used to indicate a current zoom ratio. A larger zoom ratio 307 leads to a smaller FOV presented by an image displayed in the preview box 306. On the contrary, a smaller zoom ratio 307 leads to a larger FOV presented by the image displayed in the preview box 306. As shown in FIG. 3B, 1× may be a default zoom ratio of the camera application. The default zoom ratio may alternatively be another value, and the default zoom ratio is not limited in this embodiment of this application.

The preview box 306 may be used to display an image captured by a camera 193 in real time. The electronic device may refresh display content in the preview box 306 in real time, so that the user previews an image currently captured by the camera 193.

One or more photographing mode options may be displayed in the camera mode option 302. The one or more photographing mode options may include a wide aperture mode option 302A, a video recording mode option 302B, a photographing mode option 302C, a portrait mode option 302D, and a More option 302E. When detecting a user operation performed on a photographing mode option, the electronic device 100 may enable a photographing mode selected by the user. Particularly, when detecting a user operation performed on the More option 302E, the electronic device 100 may further display more other photographing mode options such as a slow-motion photographing mode option, and may present more photographing functions to the user. Not limited to FIG. 3B, the More option 302E may not be displayed in the camera mode option 302, and the user may browse another photographing mode option by sliding left/right in the camera mode option 302.

The gallery shortcut 304 may be used to start a gallery application. In response to a user operation performed on the gallery shortcut 304, for example, a tap operation, the electronic device 100 may start the gallery application. In this way, the user may conveniently view a shot photo and video without exiting the camera application and then starting the gallery application. The gallery application is a picture management application on an electronic device such as a smartphone or a tablet computer, and may also be referred to as an "album". A name of the application is not limited in this embodiment. The gallery application may support the user in performing various operations on a picture stored in the electronic device 100, for example, operations such as browsing, editing, deleting, and selecting. In addition, the electronic device 100 may further display a thumbnail of a stored image in the gallery shortcut 304.

The shutter control 303 may be used to listen to a user operation that triggers photographing. In response to the operation, the electronic device 100 may store an image in the preview box 307 as a picture in the gallery application. The camera flipping control 305 may be used to listen to a user operation that triggers camera flipping. In response to the operation, the electronic device 100 may perform camera flipping, for example, switching from a rear-facing camera to a front-facing camera.

Based on the foregoing photographing scenario, the following describes some user interfaces (user interfaces, UIs) implemented on the electronic device 100.

FIG. 4A to FIG. 4H and FIG. 5A to FIG. 5H show examples of user interfaces for zooming in a preview scenario. In embodiments of FIG. 4A to FIG. 4H and FIG. 5A to FIG. 5H, it is assumed that a zoom ratio of a long-focus camera 193-5 is 5×, and a zoom ratio of an ordinary camera 193-3 is 1×.

(1) A Zoom Ratio Increases.

Figure 4A:
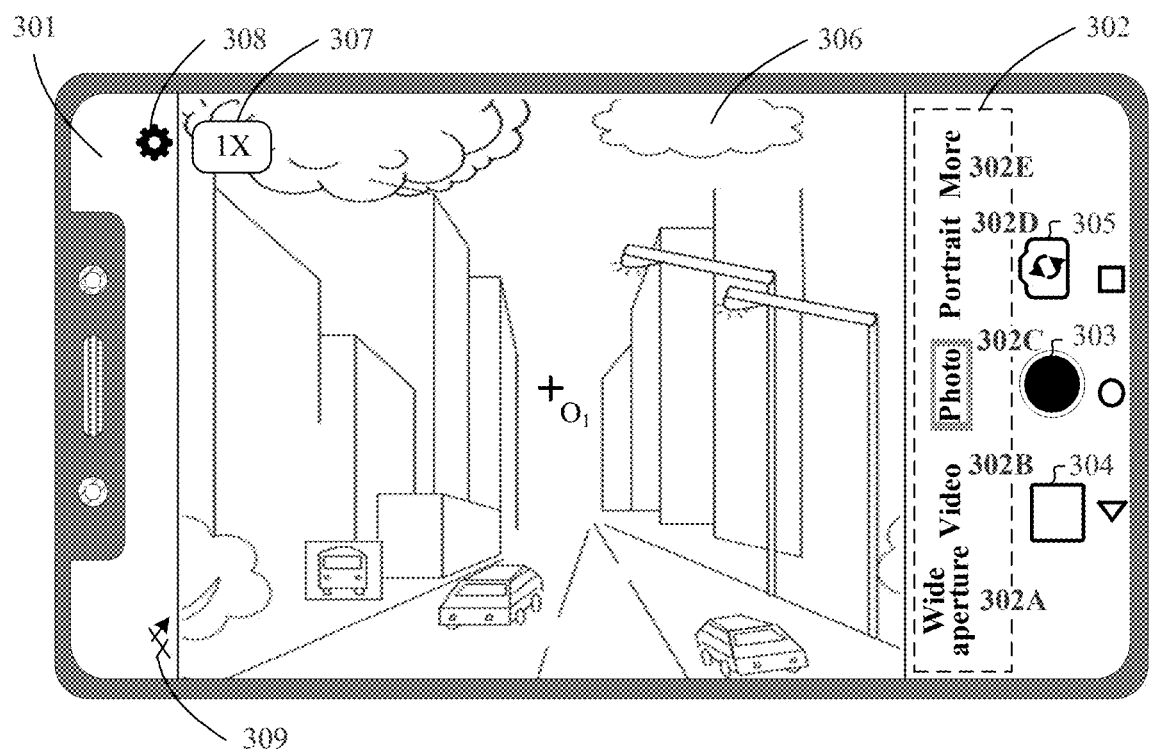
FIG. 4A to FIG. 4H show user interfaces for zooming in in a preview scenario according to an embodiment of this application.

FIG. 4A shows an example of a preview scenario: An image displayed in the preview box 306 (referred to as a preview image for short) is from the ordinary camera, and the zoom ratio 307 is 1×.

Figure 4B:
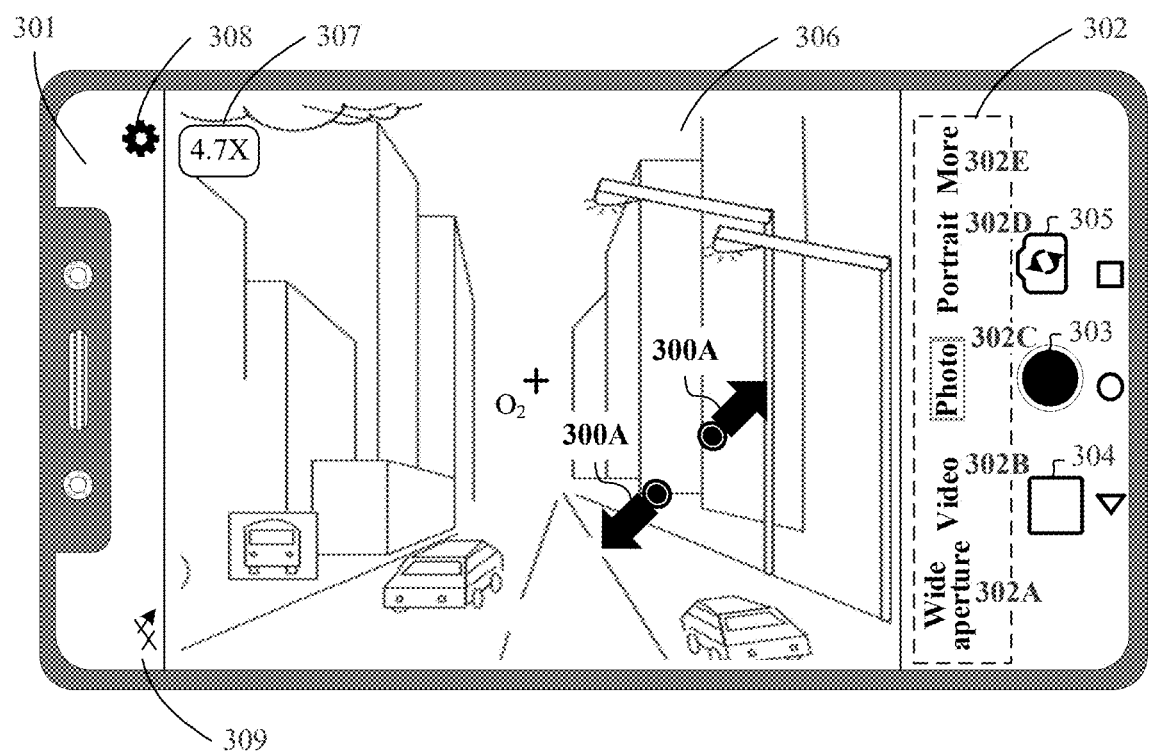
Figure 4C:
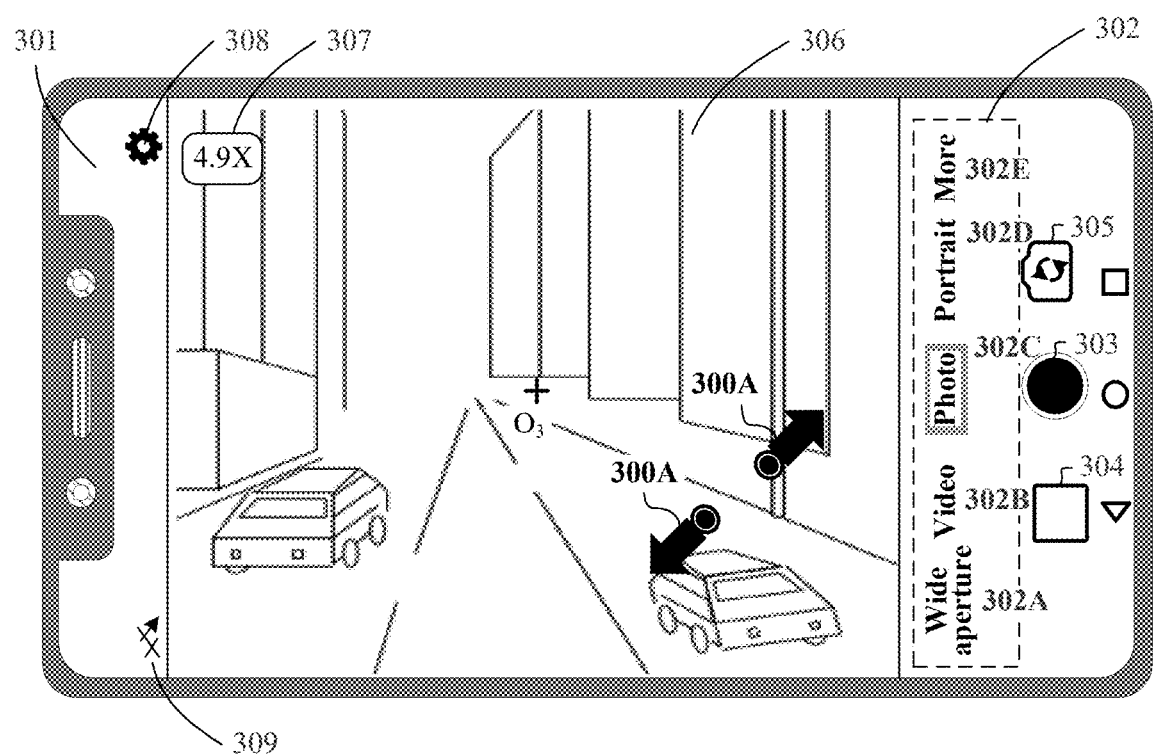
Figure 4D:
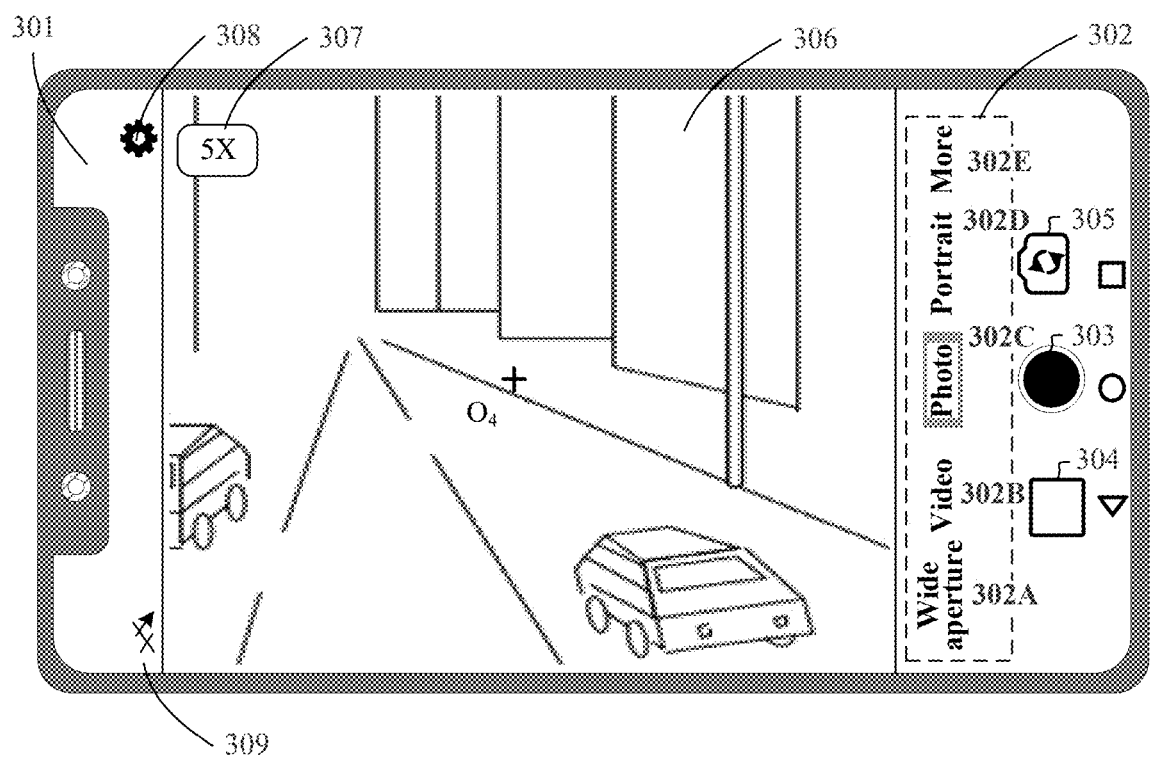

In the preview scenario shown in FIG. 4A, as shown in FIG. 4B to FIG. 4D, the electronic device 100 may detect an operation of increasing the zoom ratio, for example, a user operation 300A of stretching with two fingers. In response to the operation, the electronic device 100 may decrease an FOV presented by the preview image. At the same time, the zoom ratio 307 displayed in the preview box 306 increases. When the zoom ratio increases to 5×, the electronic device 100 may display, in the preview box 306, an image captured by the long-focus camera 193-5, that is, the preview image is switched to an image that is from the long-focus camera 193-5, that is, the electronic device 100 performs optical zoom. It is assumed that a minimum change unit of the zoom ratio is 0.1×. In this case, 4.9× to 5× is a zoom ratio for switching from the ordinary camera to the long-focus camera.

In addition to decreasing the FOV of the preview image, as shown in FIG. 4B to FIG. 4D, once the zoom ratio is increased to be close to the zoom ratio 5× of the long-focus camera 193-5, for example, when the zoom ratio 307 is "4.7×" or "4.9×" shown in the figure, the electronic device may further move an FOV center of the preview image toward an FOV center of the long-focus camera, instead of directly jumping from an FOV center of the ordinary camera to the FOV center of the long-focus camera 193-5. In addition, if an increased zoom ratio is closer to the zoom ratio 5× of the long-focus camera, the FOV center of the preview image at the increased zoom ratio is closer to the FOV center of the long-focus camera. In this way, as the zoom ratio is continuously increased to the zoom ratio 5× of the long-focus camera, the FOV center of the preview image gradually approaches or even finally overlaps the FOV center of the long-focus camera, thereby avoiding an FOV center jump.

Specifically, FIG. 4A, FIG. 4B, FIG. 4C, and FIG. 4D respectively show preview images at 1×, 4.7×, 4.9×, and 5×, and FOV centers of the preview images are respectively located at positions $O_1$, $O_2$, $O_3$, and $O_4$. It can be learned that $O_2$ is closer to $O_4$ than $O_1$, and $O_3$ is closer to $O_4$ than $O_2$. In this way, when the zoom ratio is close to 5×, the FOV center of the preview image does not suddenly change from $O_1$ to $O_4$, but implements a smoother transition, and no jump occurs.

The following describes, with reference to FIG. 4E to FIG. 4H, an implementation principle of an example zoom process shown in FIG. 4A to FIG. 4D.

As shown in FIG. 4E to FIG. 4H, an image M is an image captured by the ordinary camera, FOV1 is an FOV of the ordinary camera, and FOV' is an FOV of the long-focus camera. The FOV of the ordinary camera covers the FOV of the long-focus camera, and a distance between an FOV center O' of the long-focus camera and an FOV center $O_1$ of the ordinary camera is relatively long. The relatively long distance is caused because optical centers of the long-focus camera 193-5 and the ordinary camera 193-3 do not overlap. To prevent this from causing an FOV center jump in the zoom process, in a process of continuously increasing the zoom ratio, when cropping the image M captured by the ordinary camera, the electronic device 100 may enable a cropping center of a cropping area to gradually approach the FOV center of the long-focus camera, that is, perform incremental eccentric cropping.

Figure 4E:
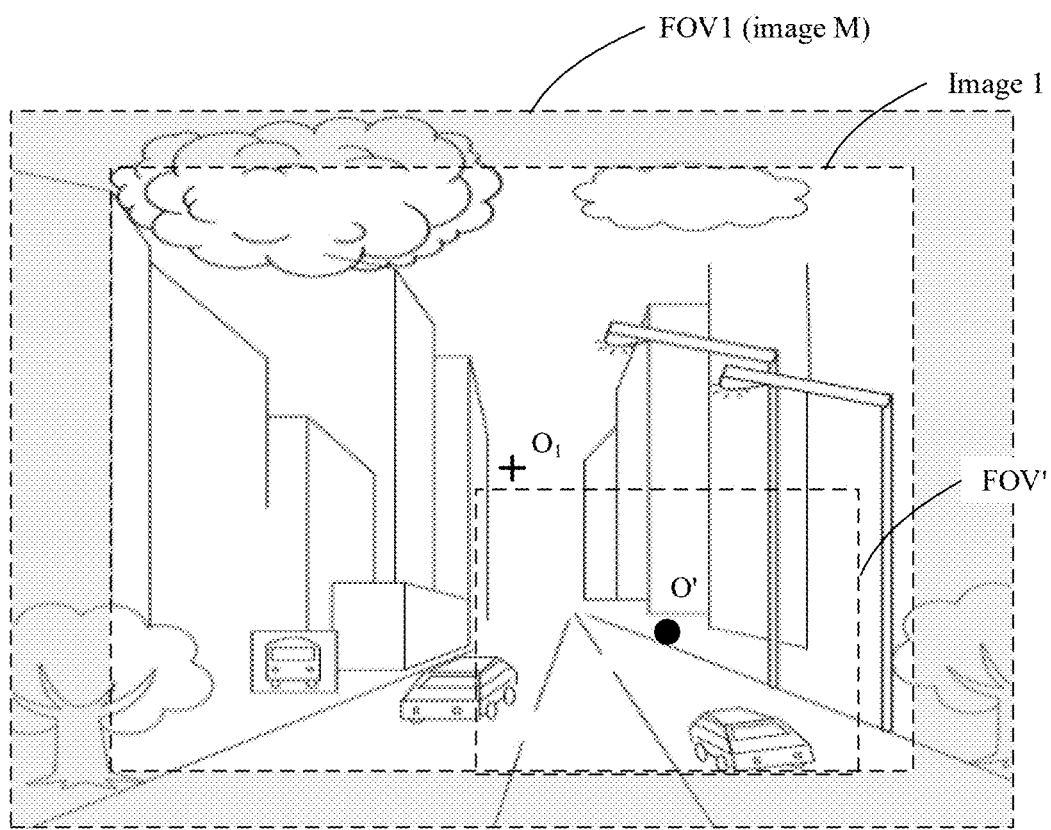
Figure 4F:
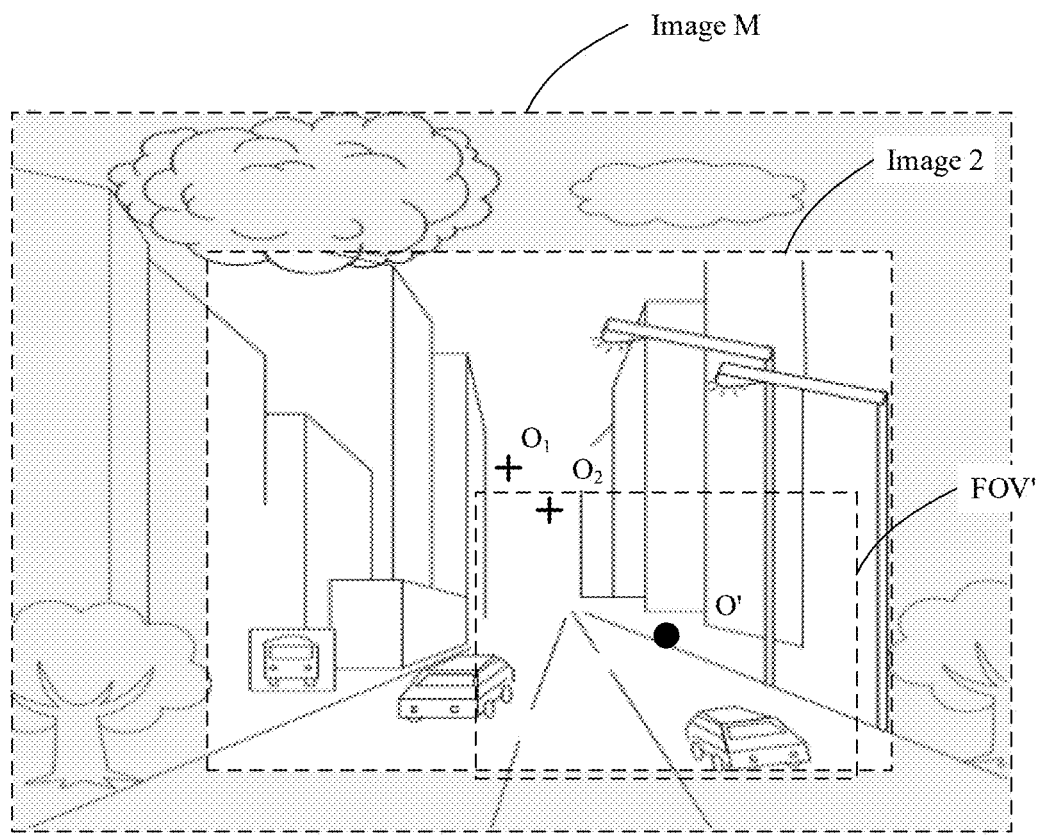
Figure 4G:
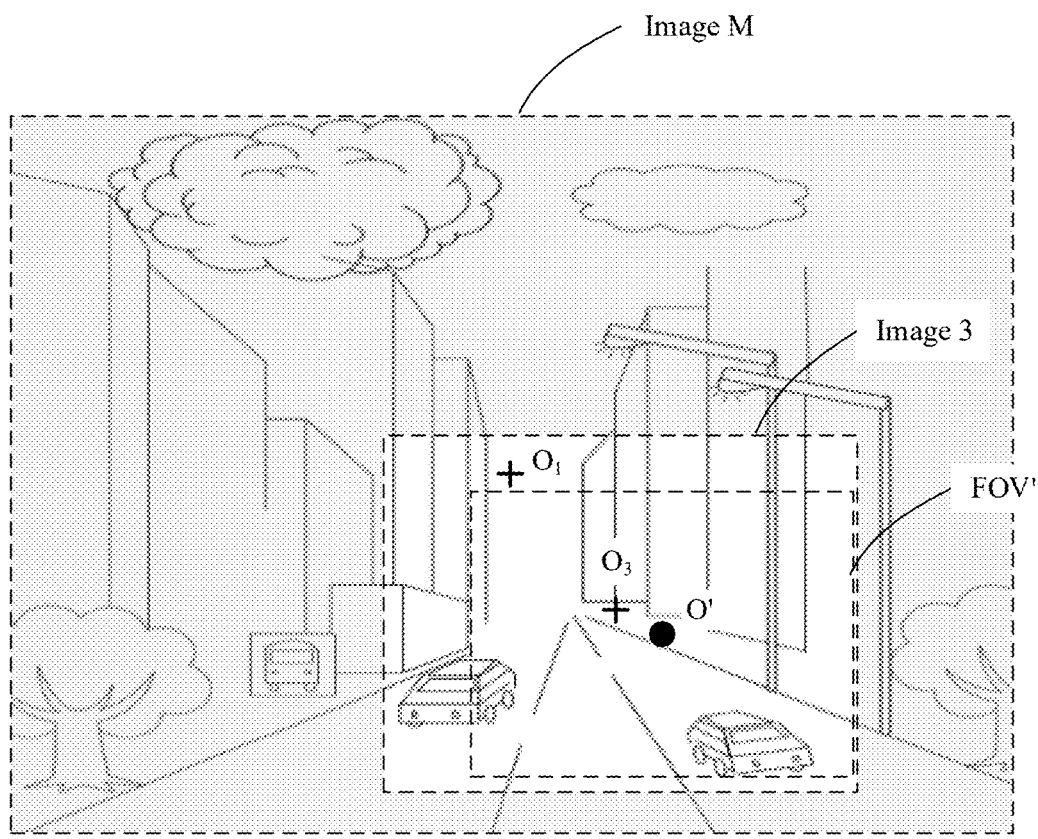
Figure 4H:
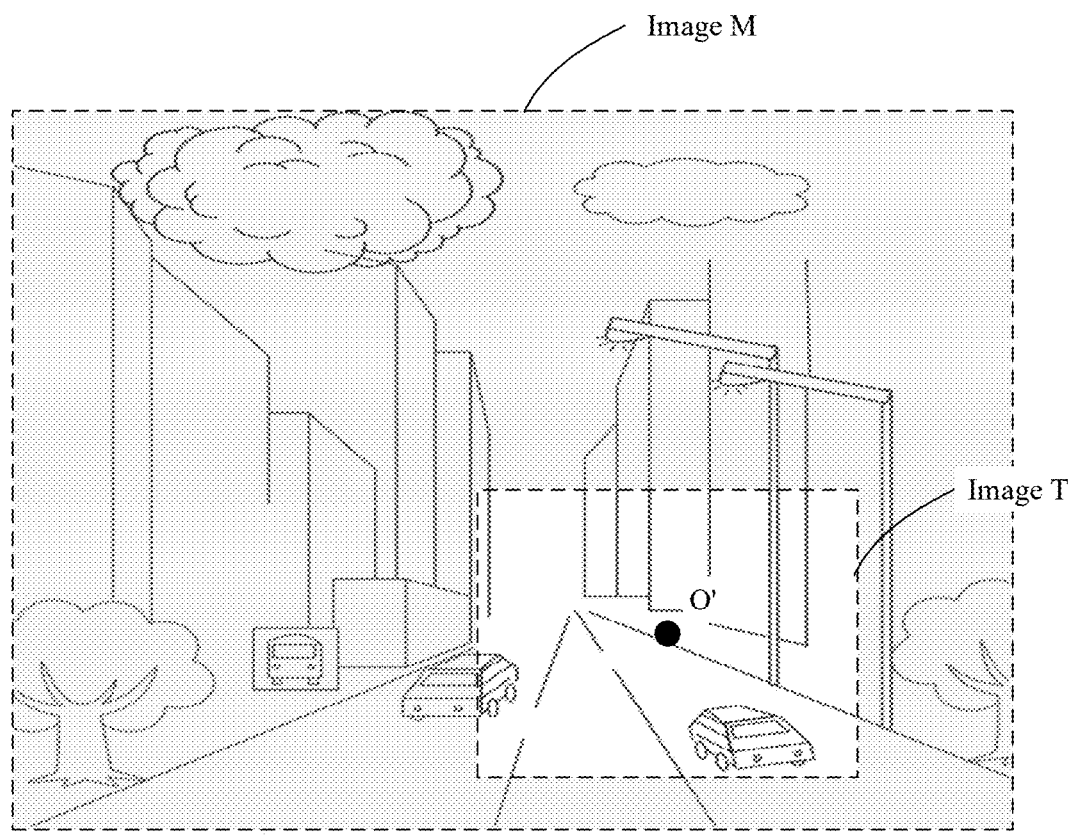

Specifically, as shown in FIG. 4E, an image 1 is a preview image at 1×, and the image 1 may be obtained by cropping the image M. An FOV center of the image 1 overlaps a center $O_1$ of FOV1 (the FOV of the ordinary camera). As shown in FIG. 4F, an image 2 is a preview image at 4.7×, and the image 2 may be obtained by cropping the image M. An FOV center $O_2$ of the image 2 no longer overlaps the center $O_1$ of FOV1 (the FOV of the ordinary camera), but deviates from $O_1$ and is closer to the FOV center O' of the long-focus camera. As shown in FIG. 4G, an image 3 is a preview image at 4.9×, and the image 3 may be obtained by cropping the image M. An FOV center $O_3$ of the image 3 further deviates from $O_1$, and is closer to the FOV center O' of the long-focus camera than the FOV center $O_2$ of the image 2. As shown in FIG. 4H, an image T is an image displayed in the preview box 306 at 5×, and the image T is an image captured by the long-focus camera. An FOV center of the image T overlaps the FOV center O' of the long-focus camera.

FIG. 4E to FIG. 4H merely show an example of an implementation of incremental eccentric cropping. Not limited to this, the electronic device may alternatively perform incremental eccentric cropping from the beginning of zooming. For example, the electronic device may perform incremental eccentric cropping in a whole digital zoom process from 1× to 1.5×, 2×, . . . , and 4.9×. In addition, a speed at which incremental eccentric cropping approaches the FOV center of the long-focus camera is not limited in this application. For example, the electronic device may enable incremental eccentric cropping to move toward the FOV center of the long-focus camera once every time the zoom ratio changes by 0.1×, or move toward the FOV center of the long-focus camera once every time the zoom ratio changes by 0.2×. The speed of approaching the FOV center of the long-focus camera may also be reflected by a moving distance of moving toward the FOV center of the long-focus camera each time, for example, five pixels. A larger moving distance leads to faster approaching toward the FOV center of the long-focus camera.

It can be learned from the embodiment of FIG. 4A to FIG. 4H that camera switching may occur when the zoom ratio is increased, for example, switching from a camera (for example, the ordinary camera) having a larger FOV to a camera (for example, the long-focus camera) having a smaller FOV. To implement a smooth transition of an FOV center, near a zoom ratio for camera switching, the electronic device may perform incremental eccentric cropping on an image captured by the camera (for example, the ordinary camera) having a larger FOV. In this way, near the zoom ratio for camera switching, for example, at 4.6×, 4.7×, 4.8×, and 4.9×, centers of cropping areas gradually approach an FOV center of the camera having a smaller FOV, so that an FOV center of a preview image presents a smooth transition, instead of directly and suddenly changing from an FOV center of the camera having a larger FOV to the FOV center of the camera having a smaller FOV, thereby avoiding an FOV center jump.

The manner of increasing a zoom ratio described in the embodiment of FIG. 4A to FIG. 4H is also applicable to a zoom ratio increase scenario of switching from a wide-angle camera to an ordinary camera, a scenario of switching from an ultra-wide-angle camera to a wide-angle camera, and a scenario of switching from a long-focus camera to an ultra-long-focus camera.

(2) A Zoom Ratio Decreases.

Figure 5A:
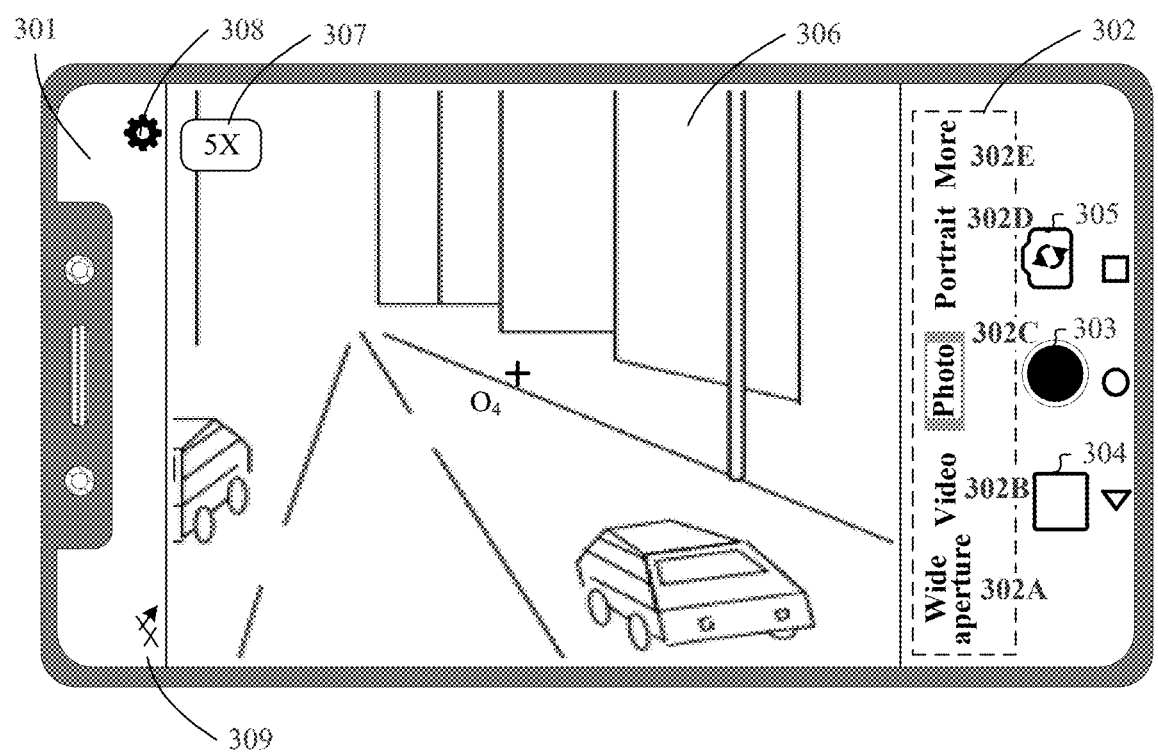
FIG. 5A to FIG. 5H show user interfaces for zooming out in a preview scenario according to an embodiment of this application.

FIG. 5A shows an example of a preview scenario: An image displayed in the preview box 306 (referred to as a preview image for short) is from the long-focus camera, and the zoom ratio 307 is 5× or higher.

Figure 5B:
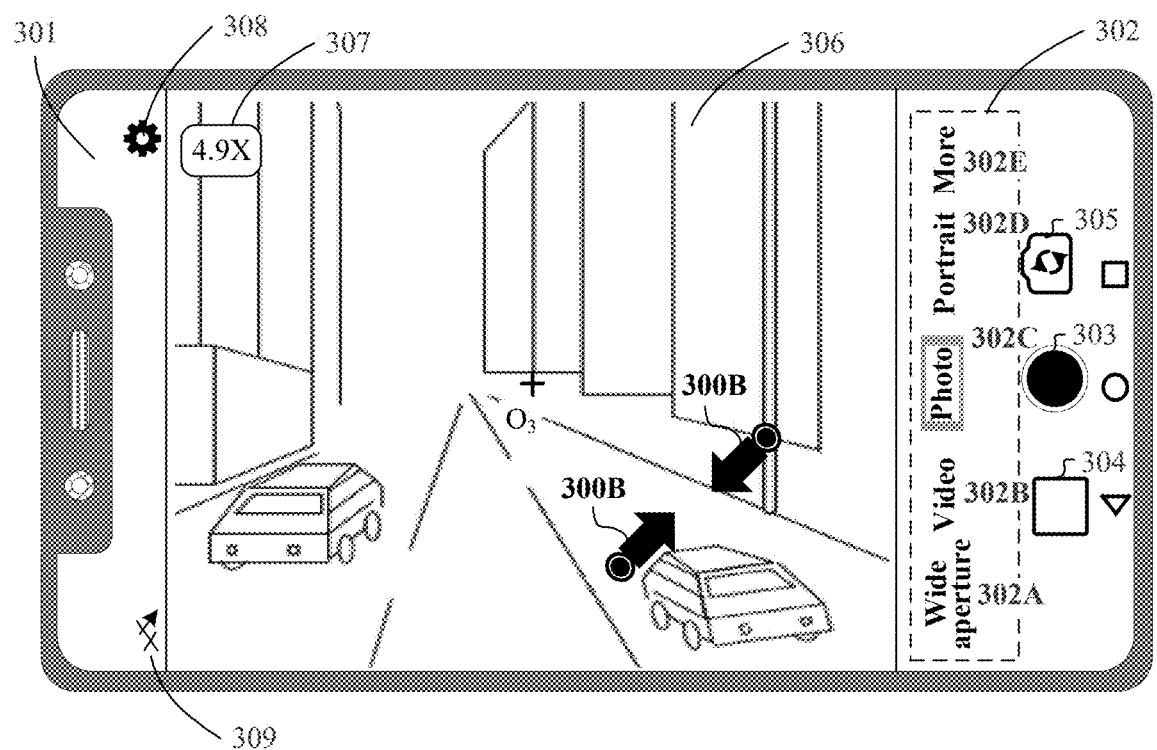
Figure 5C:
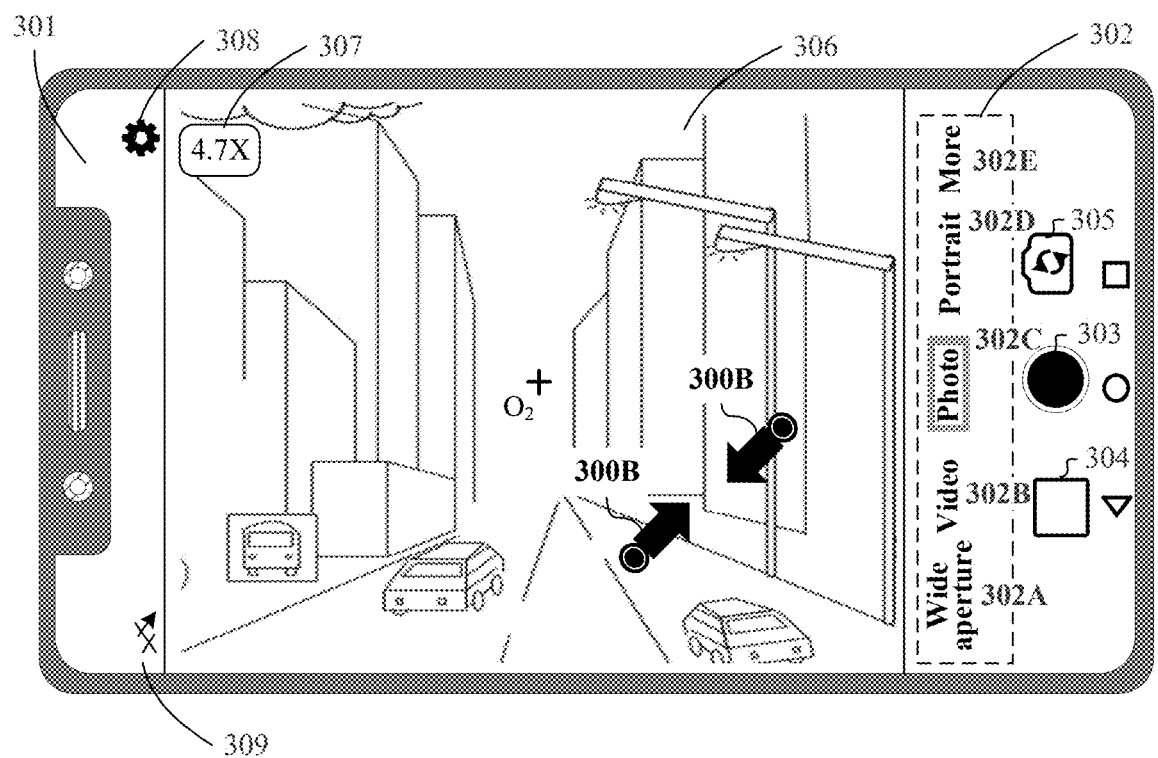
Figure 5D:
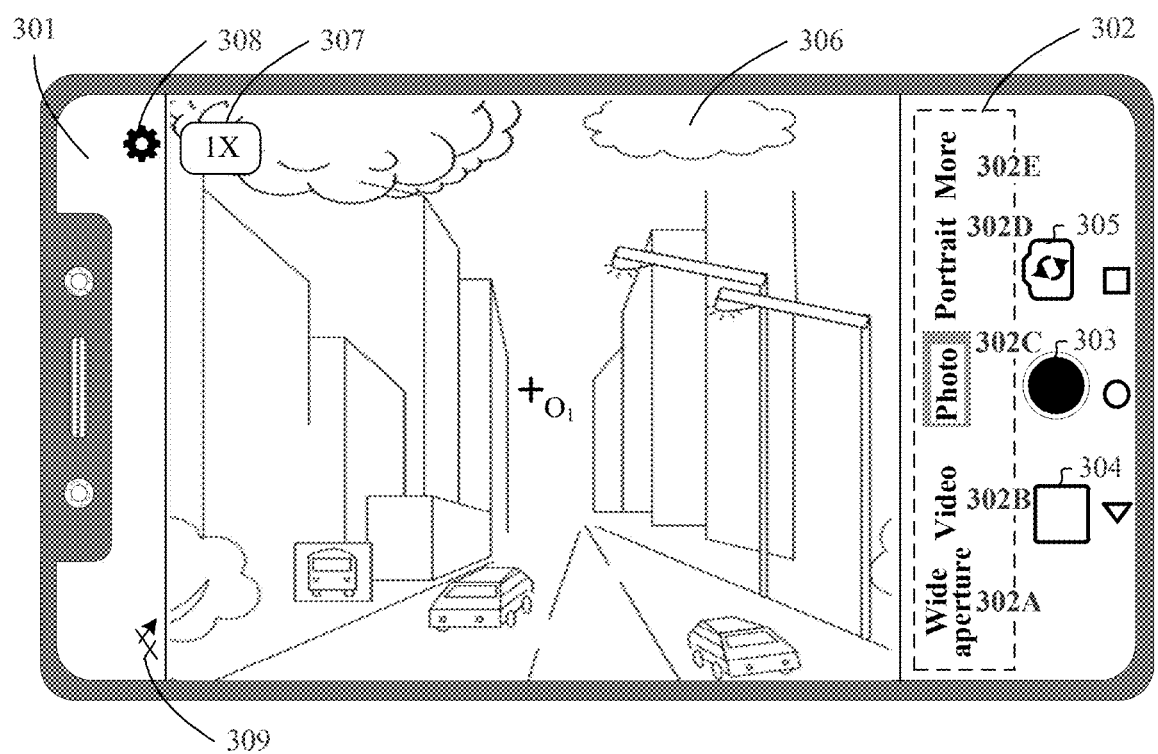

In the preview scenario shown in FIG. 5A, as shown in FIG. 5B to FIG. 5D, the electronic device 100 may detect an operation of decreasing the zoom ratio, for example, a user operation 300B of pinching with two fingers. In response to the operation, the electronic device 100 may increase an FOV presented by the preview image. At the same time, the zoom ratio 307 displayed in the preview box 306 decreases. When the zoom ratio decreases to 4.9×, the electronic device 100 may display, in the preview box 306, an image captured by the ordinary camera 193-3, that is, the preview image is switched to an image that is from the ordinary camera 193-3, that is, the electronic device 100 performs optical zoom. It is assumed that a minimum change unit of the zoom ratio is 0.1×. In this case, 5× to 4.9× is a zoom ratio for switching from the long-focus camera 193-5 to the ordinary camera 193-3.

In addition to increasing the FOV of the preview image, as shown in FIG. 5B to FIG. 5D, once the zoom ratio is decreased to be close to the zoom ratio 5× of the long-focus camera and less than 5×, for example, when the zoom ratio 307 is "4.9×" or "4.7×" shown in the figure, the electronic device may further move an FOV center of the preview image in a direction of getting away from an FOV center of the ordinary camera and approaching an FOV center of the ordinary camera, instead of directly jumping from the FOV center of the long-focus camera to the FOV center of the ordinary camera. In addition, near the zoom ratio 5× of the long-focus camera, a smaller zoom ratio indicates that the FOV center of the preview image at the zoom ratio is farther away from the FOV center of the long-focus camera and closer to the FOV center of the ordinary camera. In this way, near the zoom ratio 5× of the long-focus camera, as the zoom ratio continuously decreases, the FOV center of the preview image slowly gets away from the FOV center of the long-focus camera, and implements a smooth transition from the FOV center of the long-focus camera to the FOV center of the ordinary camera, thereby avoiding an FOV center jump.

Specifically, FIG. 5A, FIG. 5B, FIG. 5C, and FIG. 5D respectively show images displayed in the preview box 306 at 5×, 4.9×, 4.7×, and 1×, and FOV centers of the images are respectively located at positions $O_4$, $O_3$, $O_2$, and $O_1$. It can be learned that $O_3$, $O_2$, and $O_1$ gradually get away from $O_4$. That is, when the zoom ratio decreases from 5×, the FOV center of the image in the preview box 306 does not suddenly change from $O_4$ to $O_1$, but implements a smoother transition, and no jump occurs.

The following describes, with reference to FIG. 5E to FIG. 5H, an implementation principle of an example zoom process shown in FIG. 5A to FIG. 5D.

As shown in FIG. 5E to FIG. 5H, an image M is an image captured by the ordinary camera, FOV1 is an FOV of the ordinary camera, and FOV' is an FOV of the long-focus camera. The FOV of the ordinary camera covers the FOV of the long-focus camera, and a distance between an FOV center O' of the long-focus camera and an FOV center $O_1$ of the ordinary camera is relatively long. The relatively long distance is caused because optical centers of the long-focus camera 193-5 and the ordinary camera 193-3 do not overlap. To prevent this from causing an FOV center jump in the zoom process, in a process of continuously decreasing the zoom ratio, when cropping the image M captured by the ordinary camera, the electronic device 100 may enable a cropping center of a cropping area to gradually get away from the FOV center of the long-focus camera, that is, perform incremental eccentric cropping.

Figure 5E:
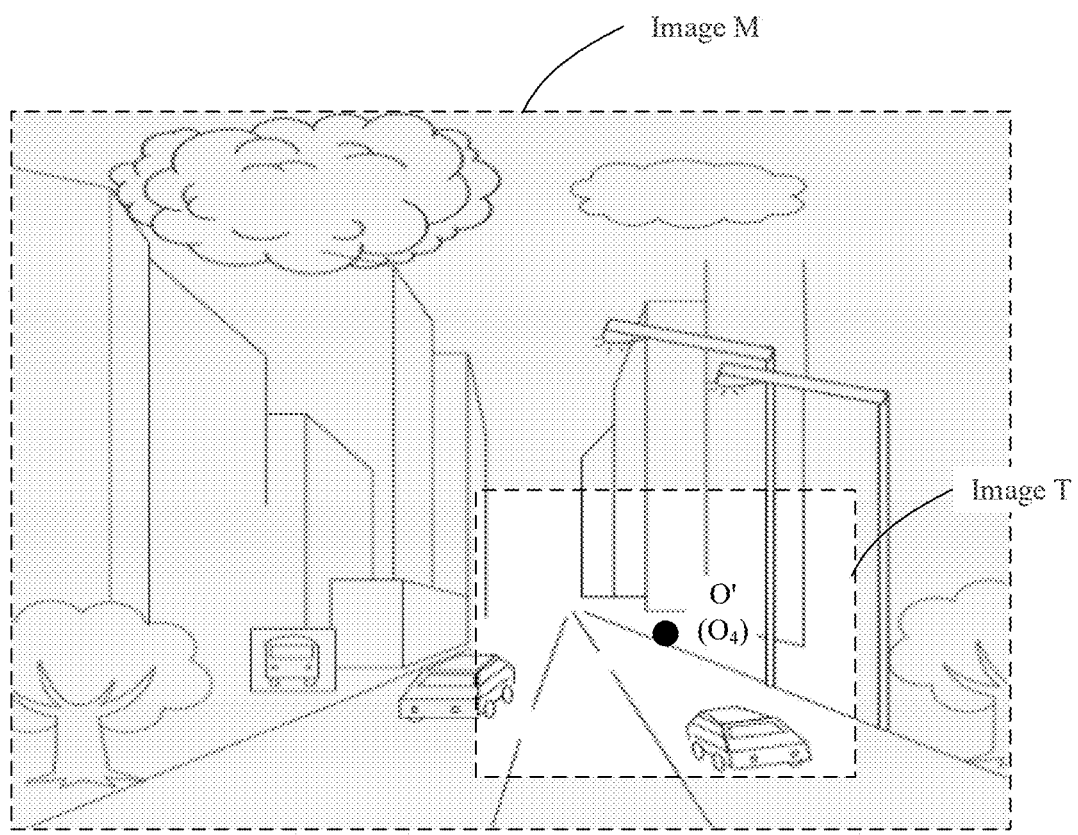
Figure 5F:
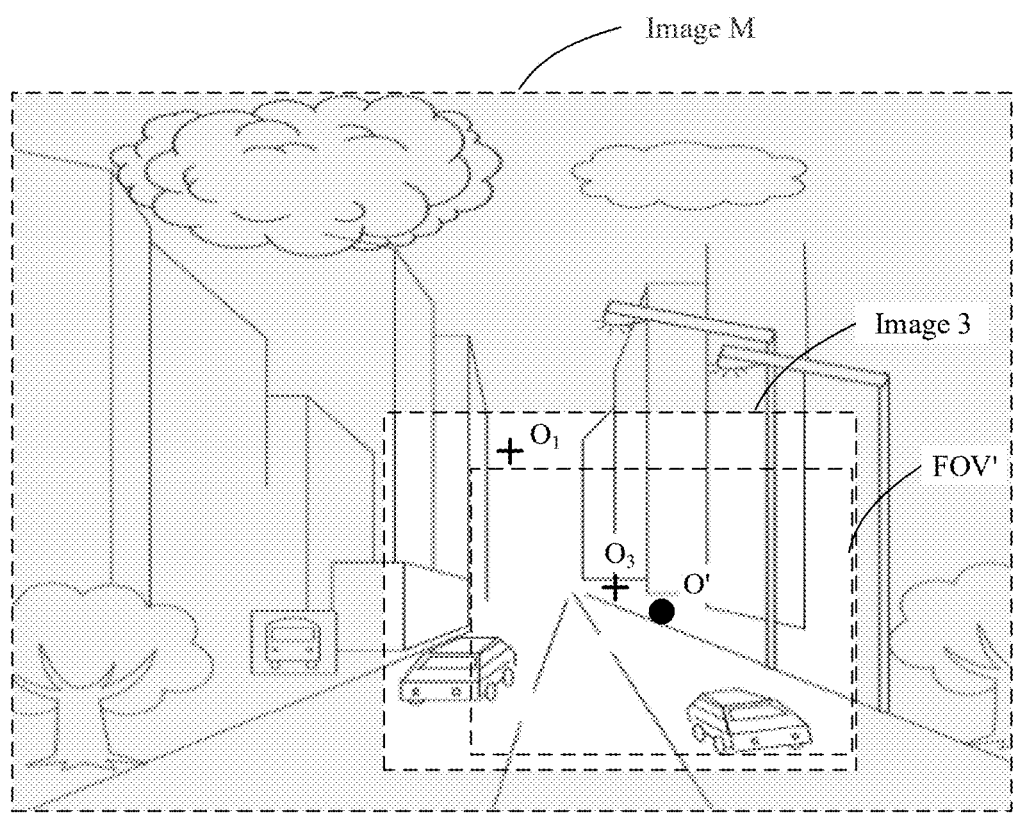
Figure 5G:
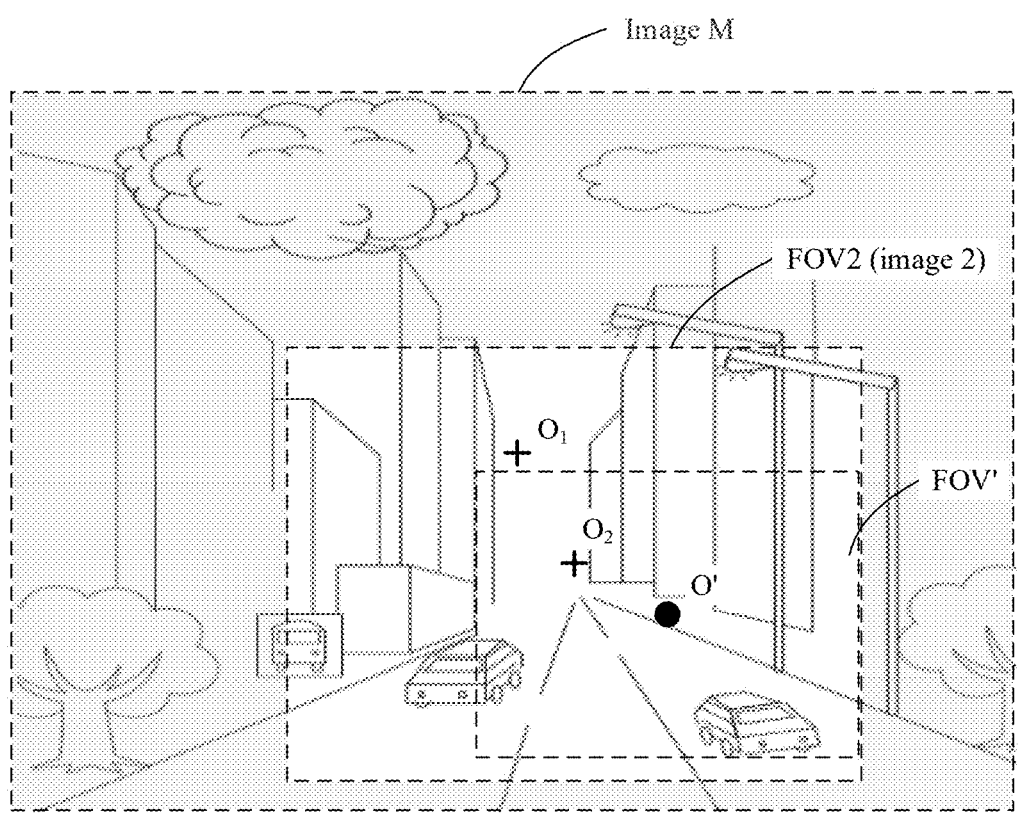
Figure 5H:
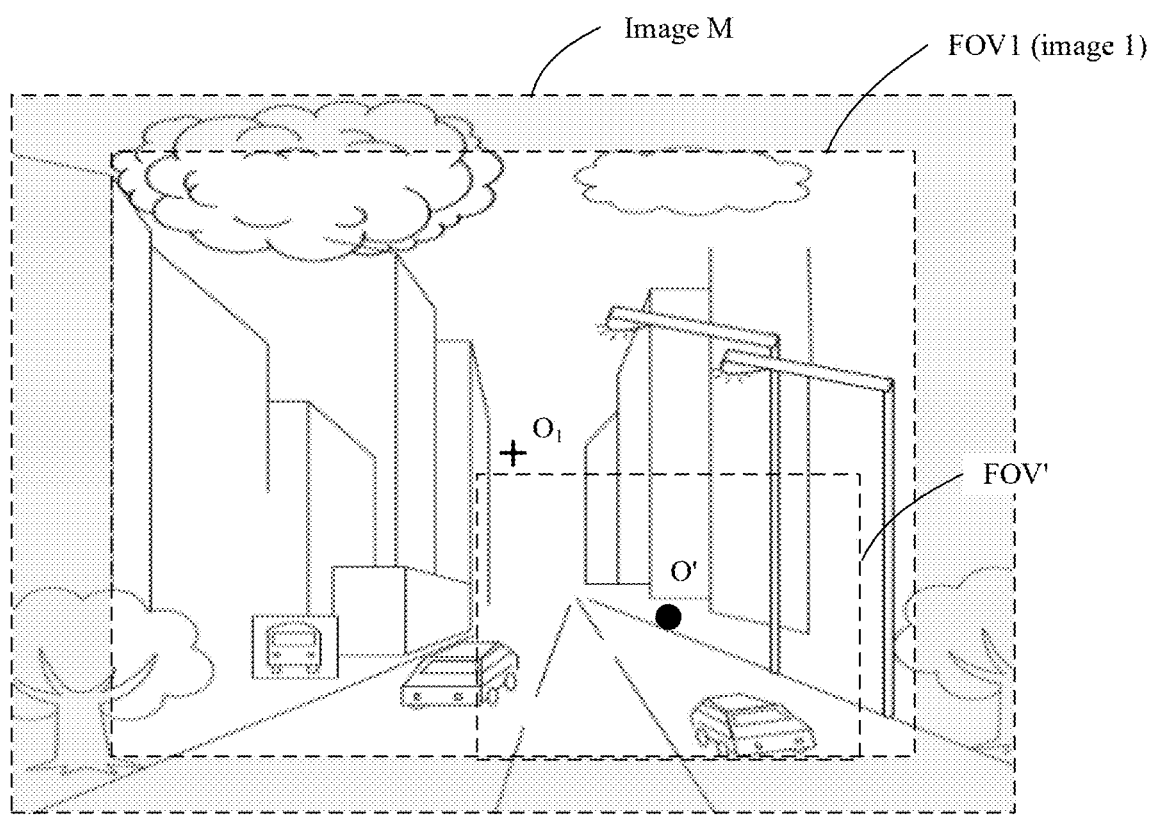

Specifically, as shown in FIG. 5E, an image T is a preview image at 5×, and the image T is an image captured by the long-focus camera. An FOV center $O_4$ of the image T overlaps the FOV center O' of the long-focus camera. As shown in FIG. 5F, an image 3 is a preview image at 4.9×, and the image 3 may be obtained by cropping the image M. An FOV center $O_3$ of the image 3 further gets away from O'. As shown in FIG. 5G, an image 2 is a preview image at 4.7×, and the image 2 may be obtained by cropping the image M. An FOV center $O_2$ of the image 2 is farther away from the FOV center O' of the long-focus camera than the FOV center $O_3$ of the image 3 at 4.9×. As shown in FIG. 5H, an image 1 is a preview image at 1×, and the image 1 may be obtained by cropping the image M. An FOV center of the image 1 overlaps a center $O_1$ of FOV1 (the FOV of the ordinary camera).

FIG. 5E to FIG. 5H merely show an example of an implementation of incremental eccentric cropping. Not limited to this, the electronic device may alternatively perform incremental eccentric cropping from the beginning of zooming. For example, the electronic device may perform incremental eccentric cropping in a whole digital zoom process from 5× to 4.9×, 4.7×, . . . , and 1×. In addition, a speed at which incremental eccentric cropping gets away from the FOV center of the long-focus camera is not limited in this application.

It can be learned from the embodiment of FIG. 5A to FIG. 5H that camera switching may occur when the zoom ratio is decreased, for example, switching from a camera (for example, the long-focus camera) having a smaller FOV to a camera (for example, the ordinary camera) having a larger FOV. To implement a smooth transition of an FOV center, near a zoom ratio for camera switching, the electronic device may perform incremental eccentric cropping on an image captured by the camera (for example, the ordinary camera) having a larger FOV. In this way, near the zoom ratio for camera switching, for example, at 4.9×, 4.8×, 4.7×, and 4.6×, centers of cropping areas gradually get away from an FOV center of the camera having a smaller FOV, so that an FOV center of a preview image presents a smooth transition, instead of suddenly changing from an FOV center of the camera having a smaller FOV to the FOV center of the camera having a larger FOV, thereby avoiding an FOV center jump.

The manner of decreasing a zoom ratio described in the embodiment of FIG. 5A to FIG. 5H is also applicable to a scenario of switching from an ordinary camera to a wide-angle camera, a scenario of switching from a wide-angle camera to an ultra-wide-angle camera, and a scenario of switching from an ultra-long-focus camera to a long-focus camera.

Figure 6A:
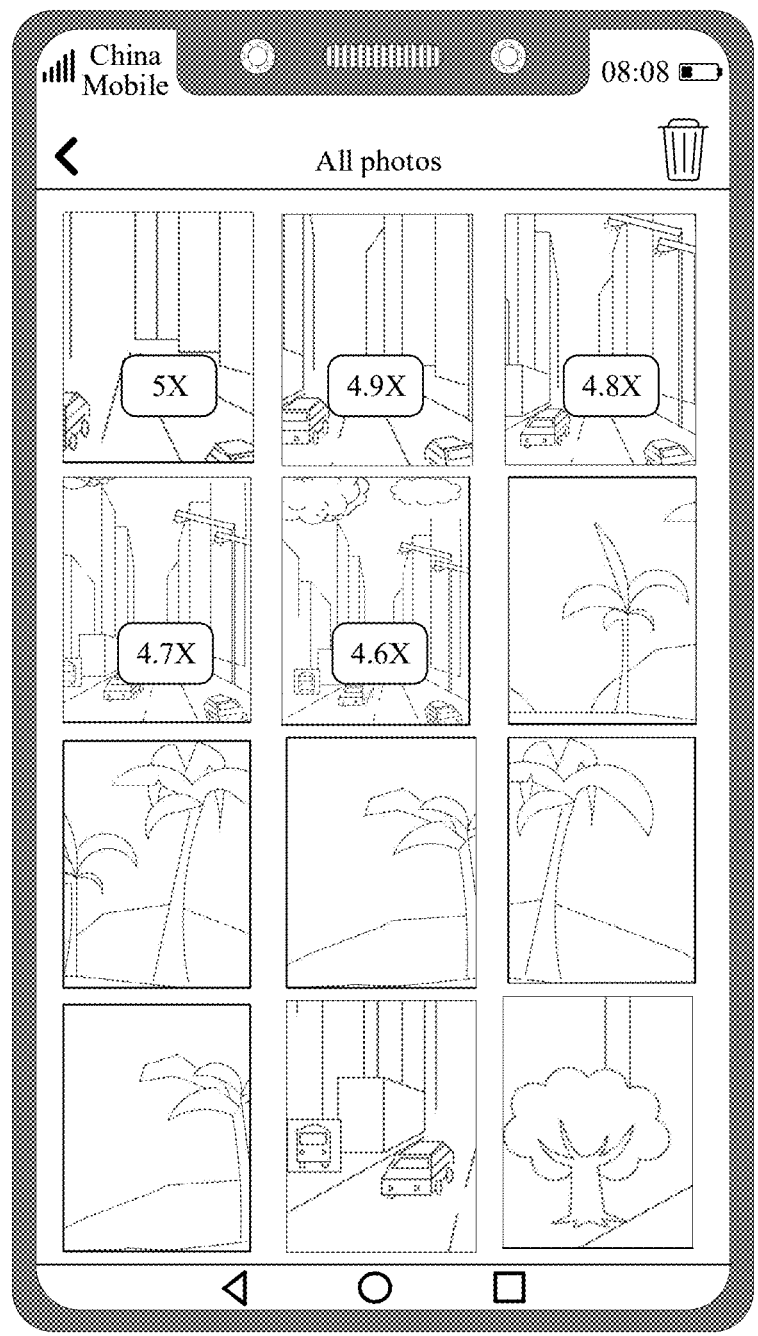
FIG. 6A and FIG. 6B show user interfaces for previewing a gallery according to an embodiment of this application.
Figure 6B:
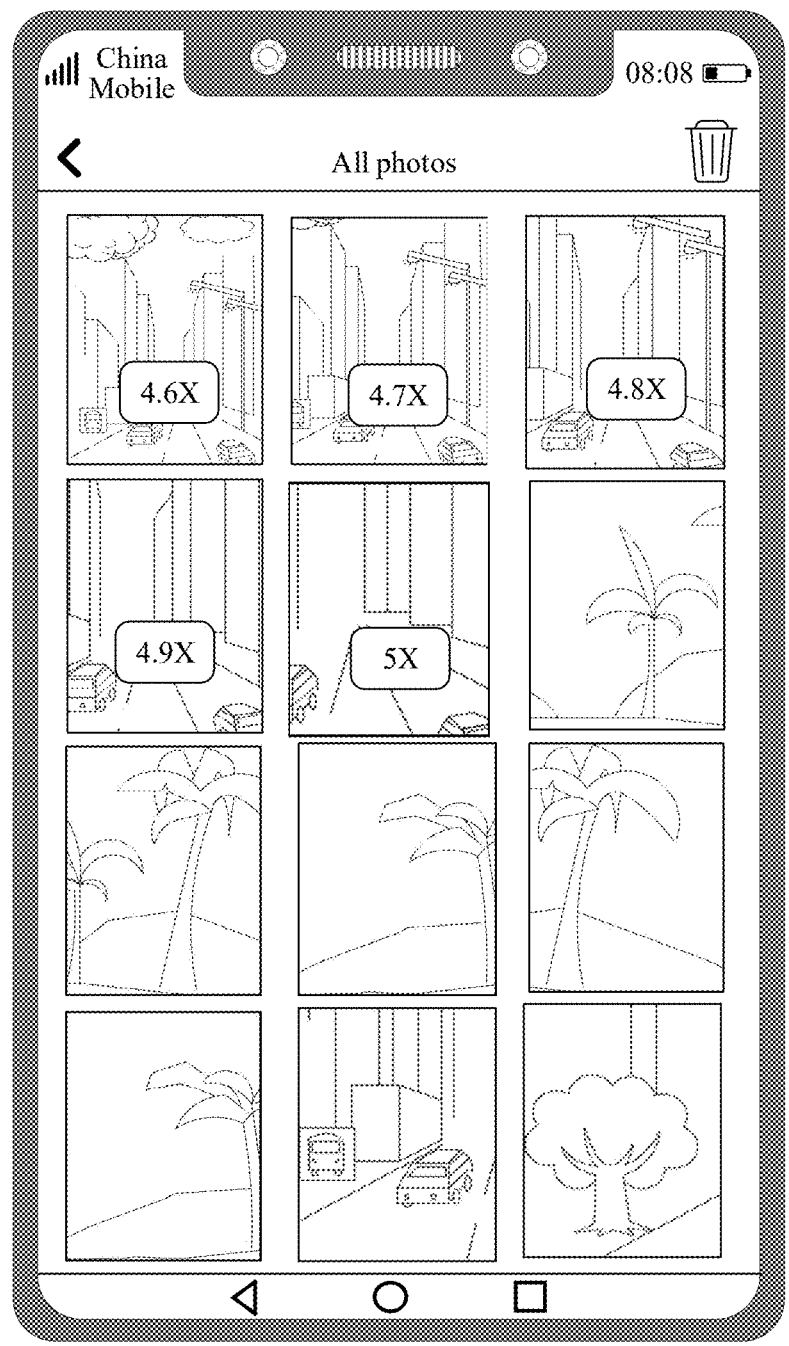
Figure 7A:
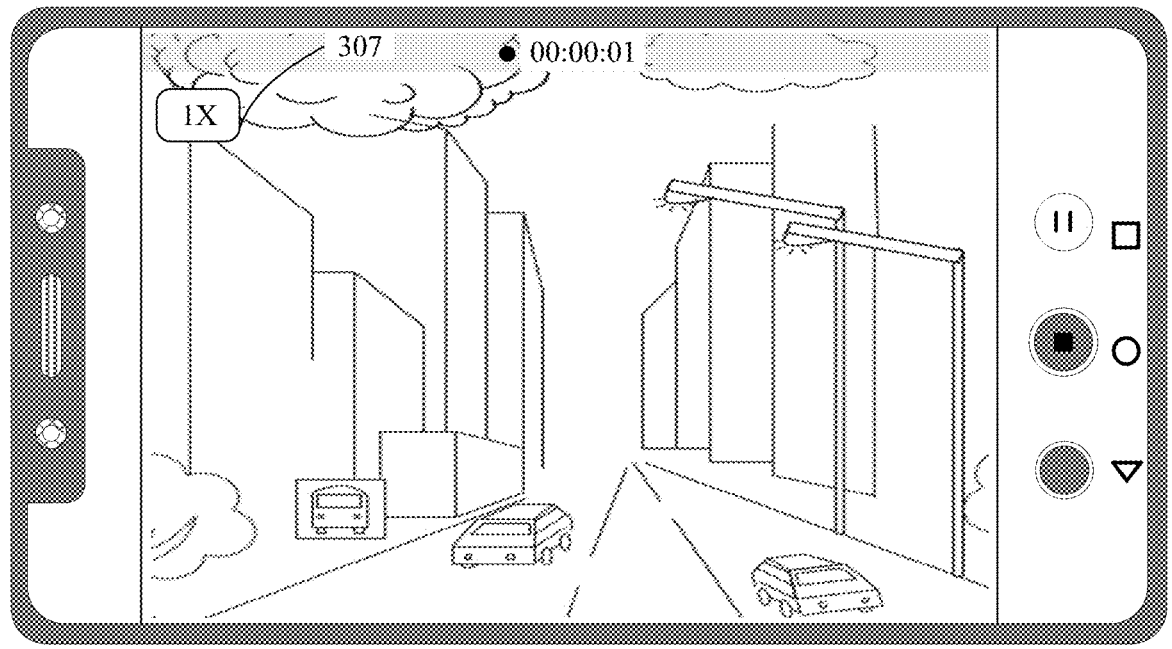
FIG. 7A to FIG. 7H show user interfaces for zooming in a video recording scenario according to an embodiment of this application.
Figure 7B:
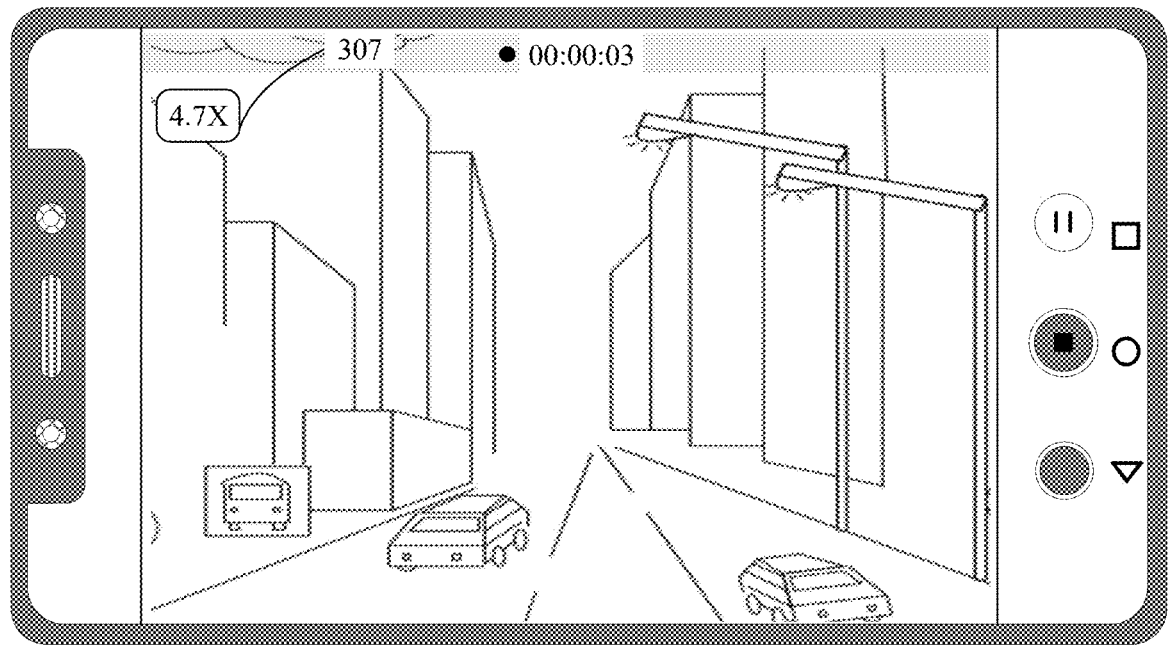
Figure 7C:
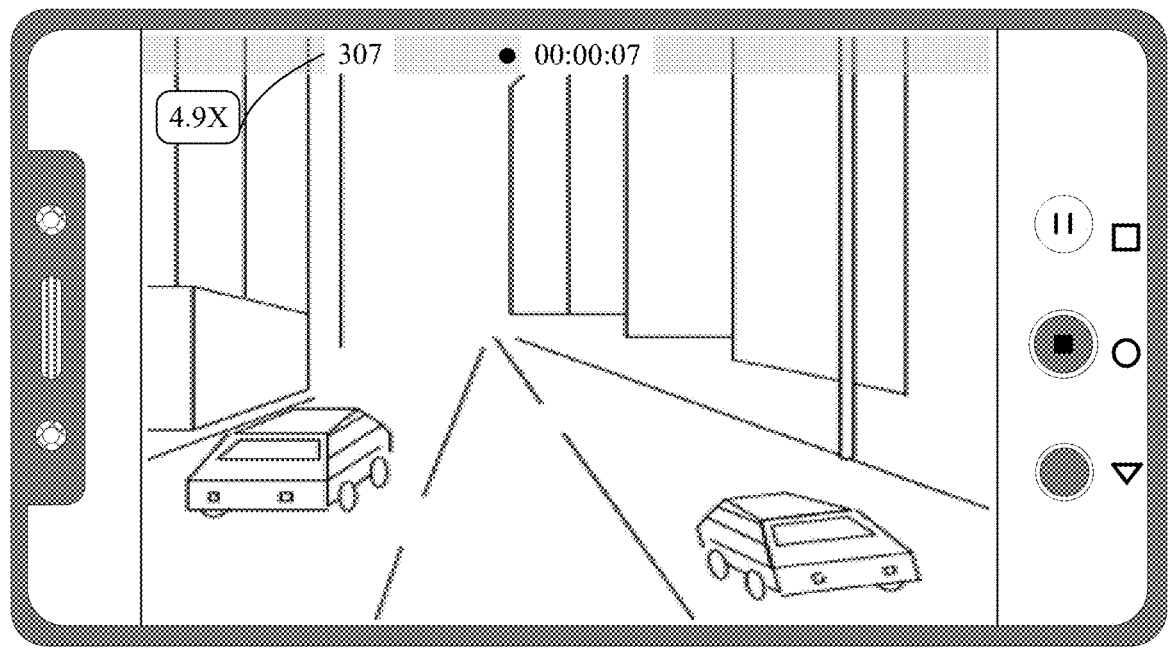
Figure 7D:
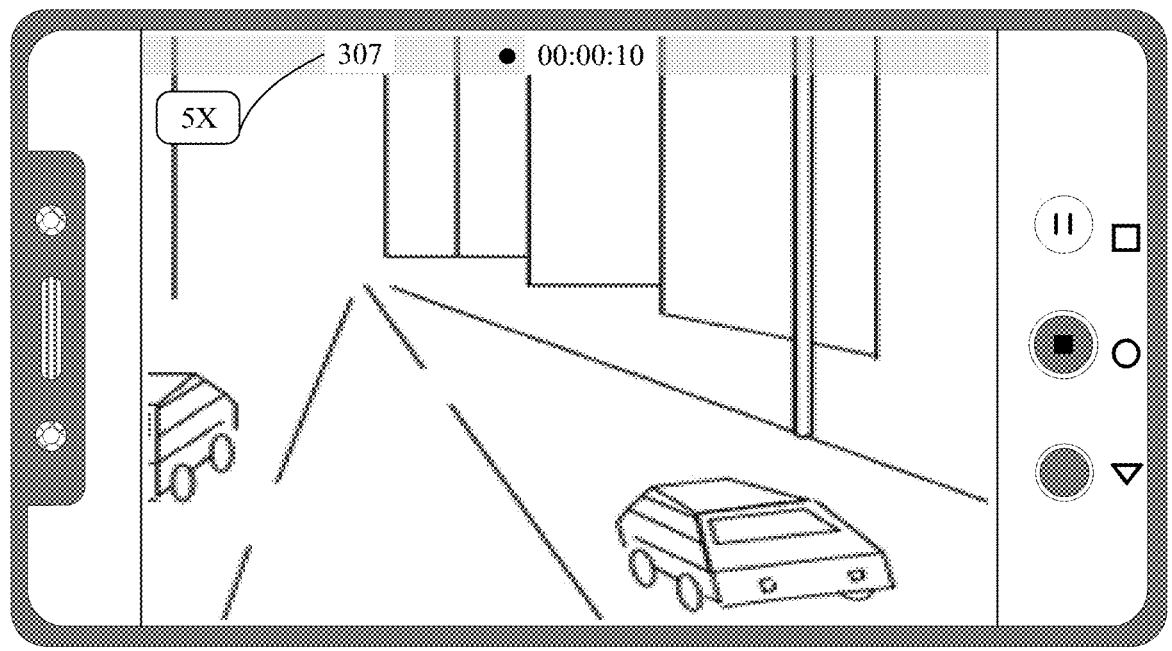
Figure 7E:
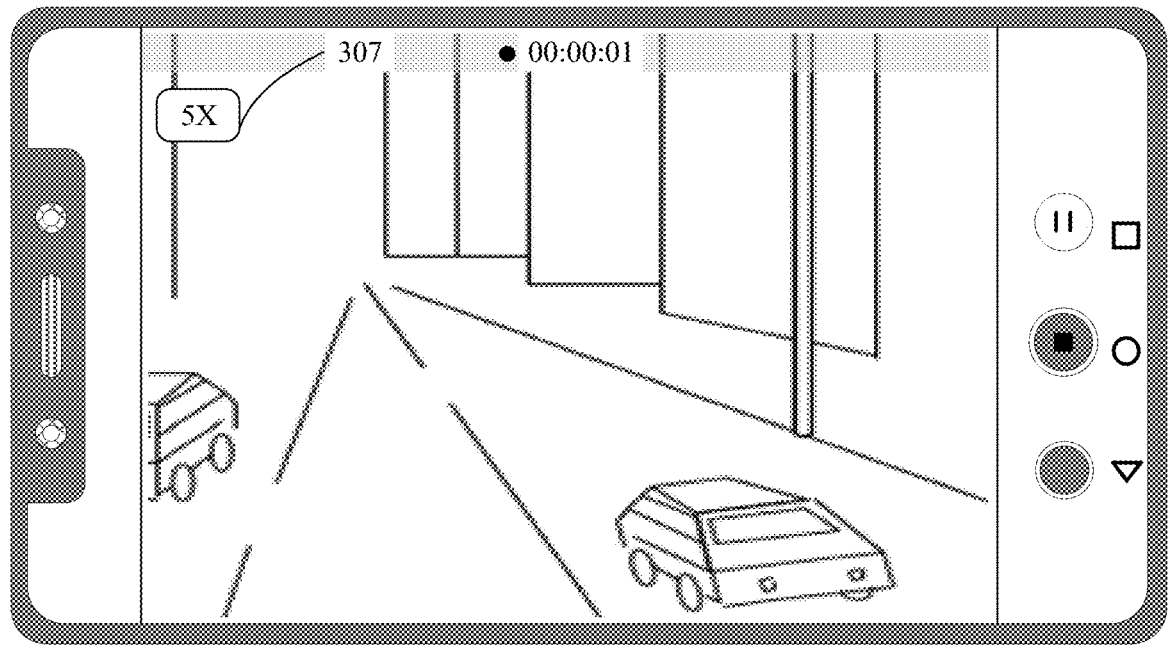
Figure 7F:
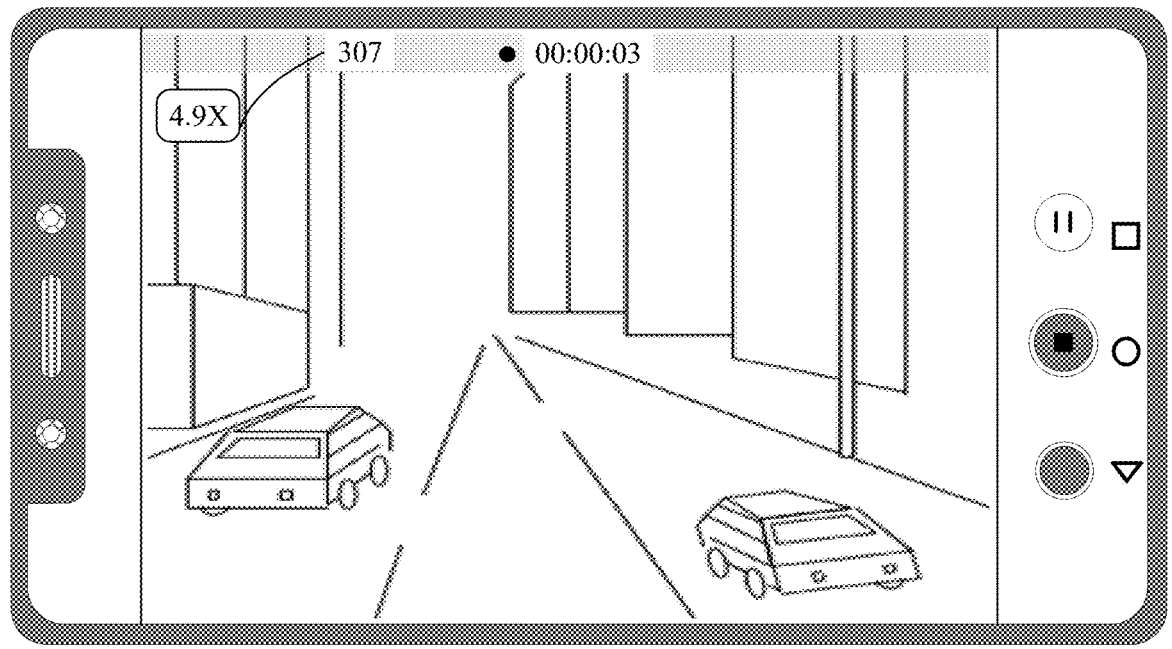
Figure 7G:
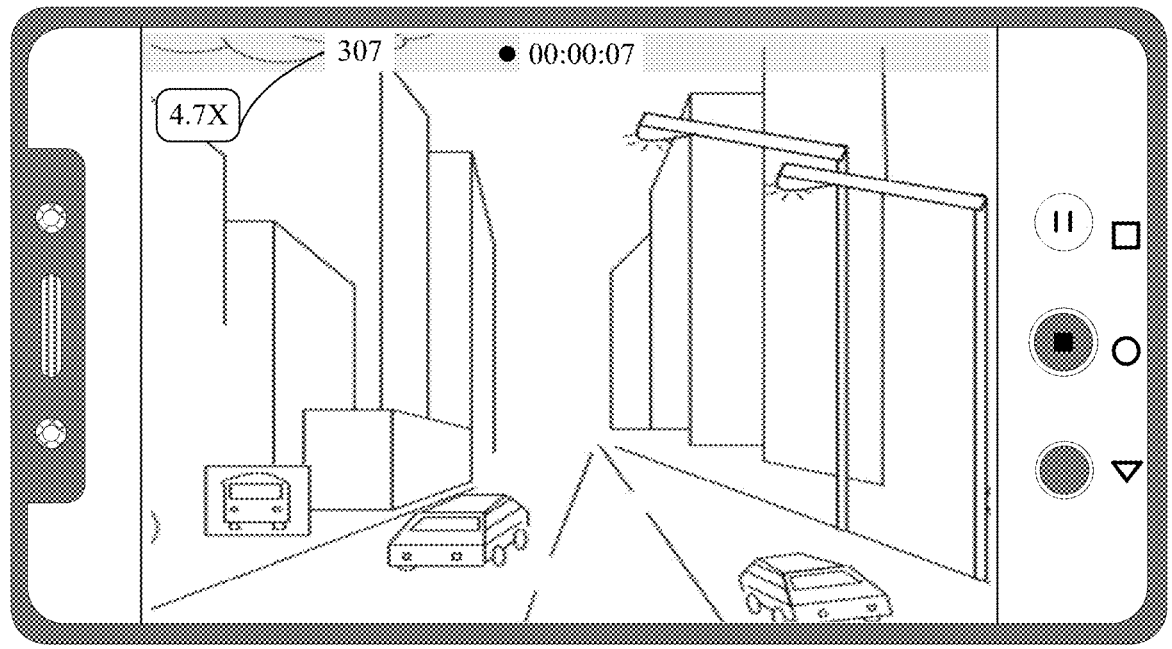
Figure 7H:
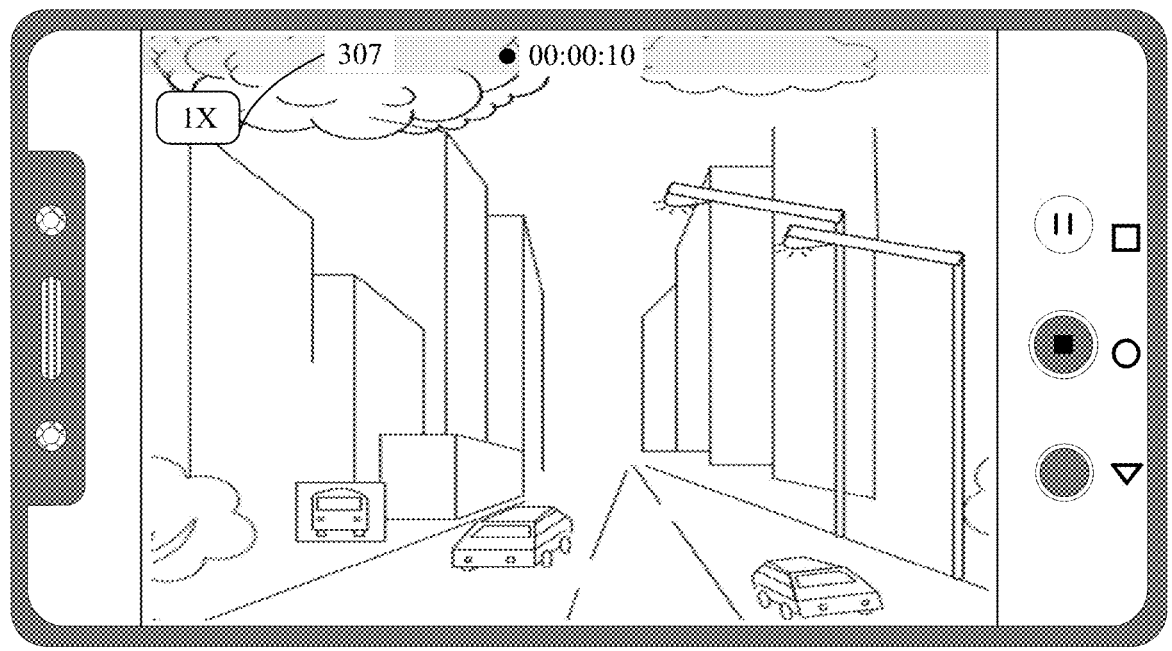

The zoom preview user interfaces shown in FIG. 4A to FIG. 4H and FIG. 5A to FIG. 5H may be further used by the user to perform photographing near a zoom ratio (for example, 4.9× to 5×) for camera switching. FIG. 6A and FIG. 6B show examples of photos that are obtained through photographing and that are stored in the gallery.

Based on the user interfaces for increasing a zoom ratio in the preview scenario that are shown in FIG. 4A to FIG. 4H, the electronic device may detect a photographing operation, for example, photographing operations successively performed at 4.6×, 4.7×, 4.8×, 4.9×, and 5×. In response to the operation, the electronic device 100 may store images in the preview box at these different ratios as photos. For example, a plurality of photos obtained through photographing successively performed at 4.6×, 4.7×, 4.8×, 4.9×, and 5× may be stored in the gallery, as shown in FIG. 6A. A ratio mark may be displayed on each photo, for example, "5×", "4.9×", "4.8×", "4.7×", and "4.6×". In addition, FOV centers presented by the plurality of photos in the gallery implement a smooth transition.

Similarly, based on the user interfaces for decreasing a zoom ratio in the preview scenario that are shown in FIG. 5A to FIG. 5H, the electronic device may detect a photographing operation, for example, photographing operations successively performed at 5×, 4.9×, 4.8×, 4.7×, and 4.6×. In response to the operation, the electronic device 100 may store images in the preview box at these different ratios as photos. For example, a plurality of photos obtained through photographing successively performed at 5×, 4.9×, 4.8×, 4.7×, and 4.6× may be stored in the gallery, as shown in FIG. 6B. A ratio mark may be displayed on each photo, for example, "4.6×", "4.7×", "4.8×", "4.9×", and "5×". In addition, FOV centers presented by the plurality of photos in the gallery implement a smooth transition.

In other words, because a preview image near the zoom ratio (for example, 4.9× to 5×) for camera switching is obtained by performing incremental eccentric cropping, FOV centers of a plurality of photos obtained through photographing near the zoom ratio for camera switching also implement a smooth transition.

FIG. 7A to FIG. 7H show examples of user interfaces for zooming in a video recording scenario. In an embodiment of FIG. 7A to FIG. 7H, it is assumed that a zoom ratio of a long-focus camera 193-5 is 5×, and a zoom ratio of an ordinary camera 193-3 is 1×.

(1) A Zoom Ratio Increases.

Same as the zoom preview embodiment shown in FIG. 4A to FIG. 4D, in a zoom video recording process shown in FIG. 7A to FIG. 7D, in response to an operation of increasing the zoom ratio, in addition to decreasing an FOV of a preview image, once an increased zoom ratio is close to the zoom ratio 5× of the long-focus camera, for example, when an icon of the zoom ratio 307 is "4.7×" and "4.9×", the electronic device may further move an FOV center of the preview image toward an FOV center of the long-focus camera. In addition, if an increased zoom ratio is closer to the zoom ratio 5× of the long-focus camera, the FOV center of the preview image at the increased zoom ratio is closer to the FOV center of the long-focus camera. In this way, as the zoom ratio is continuously increased to the zoom ratio 5× of the long-focus camera, the FOV center of the preview image gradually approaches or even finally overlaps the FOV center of the long-focus camera, thereby avoiding an FOV center jump.

A difference from the zoom preview embodiment shown in FIG. 4A to FIG. 4D lies in that an image in the preview box in FIG. 7A to FIG. 7D is a recorded image, and is to be stored as a video.

(2) A Zoom Ratio Decreases.

Same as the zoom preview embodiment shown in FIG. 5A to FIG. 5D, in a zoom video recording process shown in FIG. 7E to FIG. 7H, in response to an operation of decreasing the zoom ratio, in addition to increasing an FOV of a preview image, once the zoom ratio is decreased to be close to the zoom ratio 5× of the long-focus camera and less than 5×, for example, when an icon of the zoom ratio 307 is "4.9×" and "4.7×", the electronic device may further enable an FOV center of the preview image to gradually get away from an FOV center of the long-focus camera. In addition, near the zoom ratio of the long-focus camera, a smaller zoom ratio indicates that the FOV center of the preview image is farther away from the FOV center of the long-focus camera and closer to an FOV center of the ordinary camera. In this way, as the zoom ratio is continuously decreased to be close to the ratio of the long-focus camera and less than the zoom ratio of the long-focus camera, the FOV center of the preview image slowly leaves the FOV center of the long-focus camera and is closer to the FOV center of the ordinary camera, thereby avoiding an FOV center jump.

A difference from the zoom preview embodiment shown in FIG. 5A to FIG. 5D lies in that an image in the preview box in FIG. 7E to FIG. 7H is a recorded image, and is to be stored as a video.

Based on the foregoing UI embodiments, the following describes specific implementation of incremental eccentric cropping.

Phase 1: Performing Camera Calibration

As mentioned above, the distance between the FOV center O' of the long-focus camera 193-5 and the FOV center $O_1$ of the ordinary camera 193-3 is relatively long, and the relatively long distance is caused because the optical centers of the long-focus camera 193-5 and the ordinary camera 193-3 do not overlap. The distance causes an imaging deviation between the long-focus camera and the ordinary camera. It is crucial to determine the imaging deviation through camera calibration.

Camera calibration may be mainly used to obtain camera calibration values at a plurality of object distances (for example, 0.6 meters, 1.2 meters, and 3 meters), and the calibration values may reflect an offset between FOV centers of cameras having different focal lengths, for example, an offset between the FOV center of the ordinary camera 193-3 and the FOV center of the long-focus camera 193-5.

Camera calibration may be performed when the electronic device 100 is assembled on a production line. The following uses the ordinary camera 193-3 and the long-focus camera 193-5 as an example to briefly describe camera calibration.

(1) An Image Card is Aligned with the Optical Center of the Long-Focus Camera 193-5.

Figure 8A:
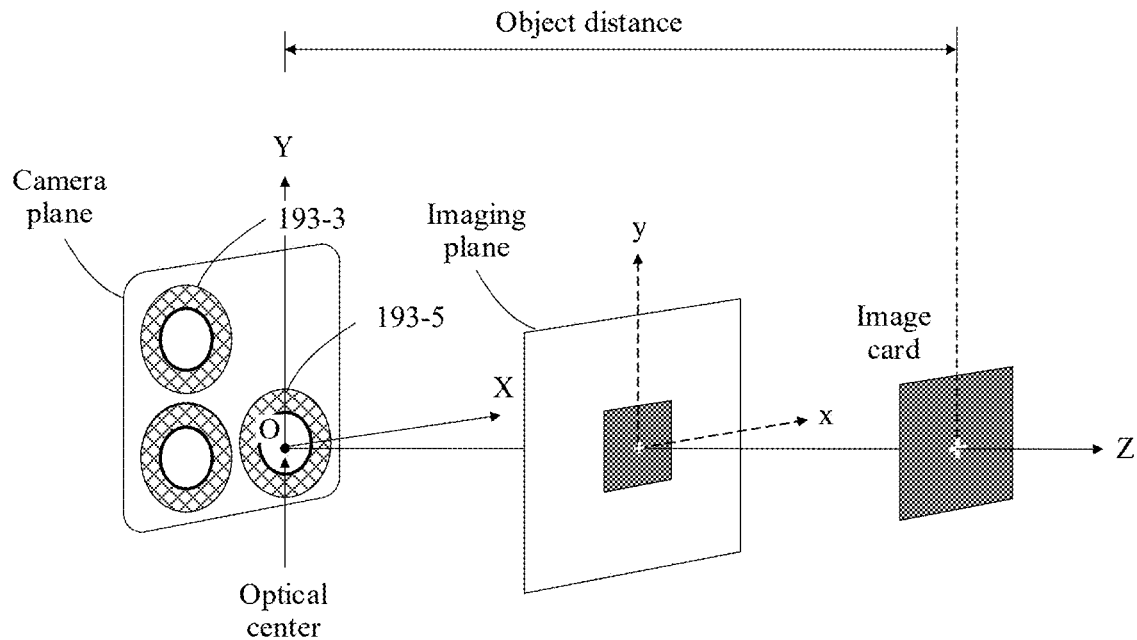
FIG. 8A to FIG. 8C show a specific implementation of zooming of an electronic device according to an embodiment of this application.

As shown in FIG. 8A, a plane of an XOY surface on which a camera is located is a camera plane, a distance from the camera plane to a plane on which the image card is located is an object distance, and an imaging plane is a plane on which a photosensitive element (such as an image sensor) in the camera is located. FIG. 8A further shows a position relationship between the camera plane, the imaging plane, and the image card. The imaging plane is between the camera plane and the image card.

First, the electronic device is fastened, so that the electronic device is parallel to the image card, and a distance (object distance) between the electronic device and the image card is a specific value, for example, 0.6 meters, 1.2 meters, or 3 meters. Then, the image card is aligned with the optical center of the long-focus camera 193-5. Specifically, the following manner may be used to determine whether the image card is aligned with the optical center of the long-focus camera: Whether a center of an image shot by the long-focus camera 193-5 overlaps an image card center in the image is determined; and if the center of the image overlaps the image card center, the image card is aligned with the optical center of the long-focus camera; or if the center of the image does not overlap the image card center, a relative position between the image card and the electronic device is slightly adjusted based on a deviation between the center of the image and the image card center, the long-focus camera 193-5 is used to shoot an image again, and the foregoing steps are repeated until the image card is aligned with the optical center of the long-focus camera 193-5.

(2) The Imaging Deviation Between the Ordinary Camera 193-3 and the Long-Focus Camera 193-5 is Calibrated.

Figure 8B:
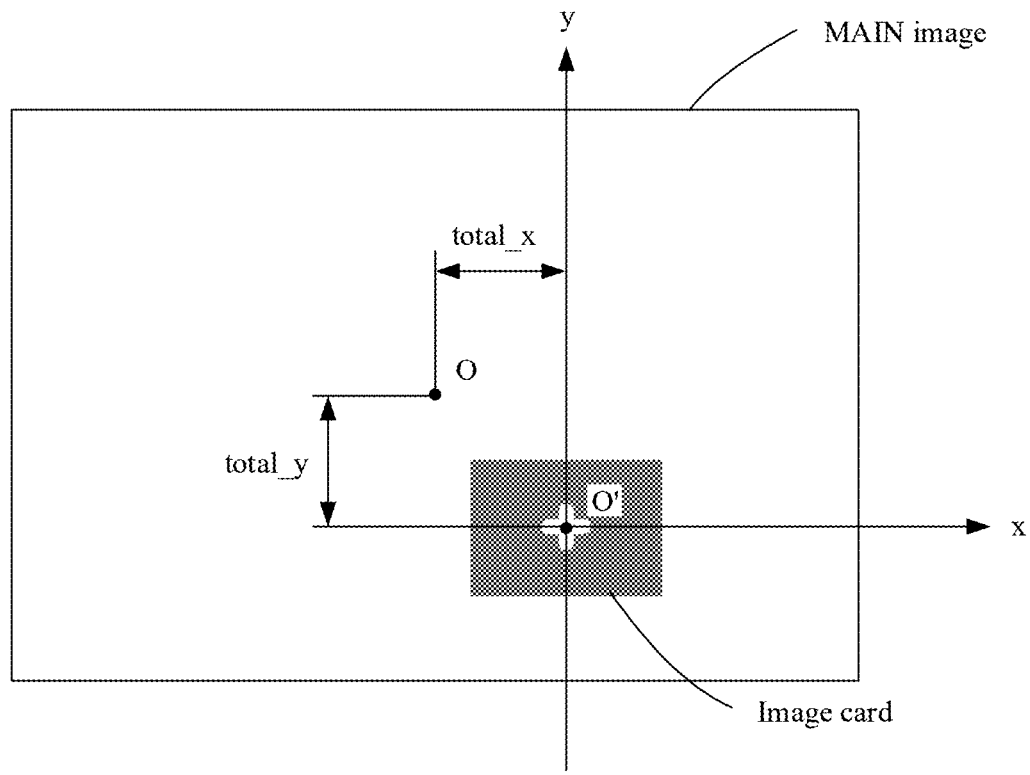

The camera is switched to the ordinary camera 193-3, and the image card is shot. As shown in FIG. 8B, a MAIN image is a picture obtained through photographing by the ordinary camera 193-3. It can be learned from the figure that there is a specific deviation between an FOV center O of the MAIN image and an image card center O'. The imaging deviation between the ordinary camera 193-3 and the long-focus camera 193-5 may be obtained by calibrating a deviation value total_x in an X-axis direction and a deviation value total_y in a Y-axis direction between the point O and the point O'.

Finally, the electronic device 100 may obtain calibration values at a plurality of object distances through camera calibration, which may be shown in the following example:

short distance(0.6 meters):total_x_near,total_y_near medium distance(1.2 meters):total_x_mid,total_y_mid long distance(3 meters):total_x_far,total_y_far Herein, total_x_near and total_y_near respectively represent deviation values of the imaging deviation between the ordinary camera and the long-focus camera in the X-axis direction and the Y-axis direction when the object distance is 0.6 meters; total_x_mid and total_y_mid respectively represent deviation values of the imaging deviation between the ordinary camera and the long-focus camera in the X-axis direction and the Y-axis direction when the object distance is 1.2 meters; and total_x_far and total_y_far respectively represent deviation values of the imaging deviation between the ordinary camera and the long-focus camera in the X-axis direction and the Y-axis direction when the object distance is 3 meters. Not limited to the object distances of 0.6 meters, 1.2 meters, and 3 meters, camera calibration may alternatively be performed at other object distances.

In an actual case, when the ordinary camera 193-3 and the long-focus camera 193-5 are calibrated, because the ordinary camera 193-3 and the long-focus camera 193-5 cannot be located on a same plane in an absolute sense, there is a specific projection deviation between imaging of the ordinary camera 193-3 and imaging of the long-focus camera 193-5. However, in production and assembly, a deviation angle difference between the two cameras may be controlled to be very small, for example, within 3.5 degrees. Therefore, the projection deviation is very small, and is not a main reason for the imaging deviation between the ordinary camera and the long-focus camera. The projection deviation does not need to be included in the camera calibration values used to perform incremental eccentric cropping.

The following uses a phase 2 to a phase 4 to describe how to perform incremental eccentric cropping based on the camera calibration values during actual photographing.

Phase 2: Determining an Actual Deviation Value Based on an Object Distance During Actual Photographing During actual photographing, the electronic device may determine an object distance M between the electronic device and a photographed object by using a distance measurement apparatus, for example, a focus motor or a laser sensor in the ordinary camera 193-3.

Based on the object distance M, the electronic device may determine a set of camera calibration values to be used, that is, determine actual deviation values total_x and total_y between an FOV center of an image shot by the ordinary camera and an FOV center of an image shot by the long-focus camera at the object distance M.

If the object distance M<0.6 m, total_x=total_x_near, and total_y=total_y_near.

If the object distance M>0.6 m, and M<1.2 m, total_x is obtained through interpolation on total_x_near and total_x_mid, and total_y is obtained through interpolation on total_y_near and total_y_mid.

If the object distance M>1.2 m, and M<3 m, total_x is obtained through interpolation on total_x_mid and total_x_far, and total_y is obtained through interpolation on total_y_mid and total_y_far.

If the object distance M>3 m, total_x=total_x_far, and total_y=total_y_far.

Phase 3: Determining a Cropping Area

The electronic device may determine, based on the camera calibration values total_x and total_y that are selected in the phase 2 and a current zoom ratio, the cropping area from the image shot by the ordinary camera 193-3.

Positions (for example, coordinates of an upper-left corner) and sizes (widths W and heights H) of the cropping area at different zoom ratios may be determined based on Table 1 below:

TABLE 1

| Zoom ratio | Coordinates of the upper-left corner | Width W | Height H |
|---|---|---|---|
| 4.6 | [(1−1/4.6)w/2 + total_x/4, (1−1/4.6)h/2 + total_y/4] | w/4.6 | h/4.6 |

TABLE 1-continued

| Zoom ratio | Coordinates of the upper-left corner | Width W | Height H |
|---|---|---|---|
| 4.7 | [(1-1/4.7)w/2 + total_x/2, (1-1/4.7)h/2 + total_y/2] | w/4.7 | h/4.7 |
| 4.8 | [(1-1/4.8)w/2 + total_x * 3/4, (1-1/4.8)h/2 + total_y * 3/4] | w/4.8 | h/4.8 |
| 4.9 | [(1-1/4.9)w/2 + total_x, (1-1/4.9)h/2 + total_y] | w/4.9 | h/4.9 |

Herein, w and h are respectively a width and a height of the image captured by the ordinary camera, and factors by which total_x and total_y are multiplied may gradually change, for example, an arithmetic sequence such as ¼, ½, ¾, and 1. The multiplied factors may be referred to as eccentric factors α, which may be used to describe a degree to which a center of the cropping area deviates from the FOV center of the ordinary camera. A larger eccentric factor α indicates that the center of the cropping area more deviates from the FOV center of the ordinary camera, and a smaller eccentric factor α indicates that the center of the cropping area less deviates from the FOV center of the ordinary camera. Not limited to the arithmetic sequence such as ¼, ½, ¾, and 1, the eccentric factor α may alternatively be increased by ⅙ or ⅜ each time. A faster increase indicates that a cropping area obtained through each time of cropping approaches or gets away from the FOV center of the long-focus camera more quickly, and a slower increase indicates that the cropping area obtained through each time of cropping approaches or gets away from the FOV center of the long-focus camera more slowly. Not limited to the arithmetic sequence, the eccentric factor α at the gradually changing ratio may alternatively not present a variation rule of the arithmetic sequence, but presents another variation rule. This is not limited in this application.

It can be learned that, near the zoom ratio for switching between the long-focus camera and the ordinary camera, as the zoom ratio approaches 5× (that is, the zoom ratio of the long-focus camera), the cropping area slowly approaches the FOV center of the long-focus camera, instead of jumping from the FOV center of the ordinary camera at 4.9× to the FOV center of the long-focus camera at 5×. As the zoom ratio becomes less than 5×, the cropping area slowly leaves the FOV center of the long-focus camera, instead of jumping from the FOV center of the ordinary camera at 5× to the FOV center of the long-focus camera at 4.9×.

Phase 4: Cropping the Image Captured by the Ordinary Camera 193-3

In a process in which the electronic device 100 performs digital zoom, the image captured by the ordinary camera 193-3 is cropped based on the coordinates of the upper-left corner, the width W, and the height H of the cropping area obtained in the phase 3.

At different zoom ratios, for example, 4.6×, 4.7×, 4.8×, and 4.9×, the center point of the cropping area deviates from a center of the image captured by the ordinary camera 193-3. Therefore, in this case, cropping performed based on the cropping area determined in the phase 3 is eccentric cropping.

Figure 8C:
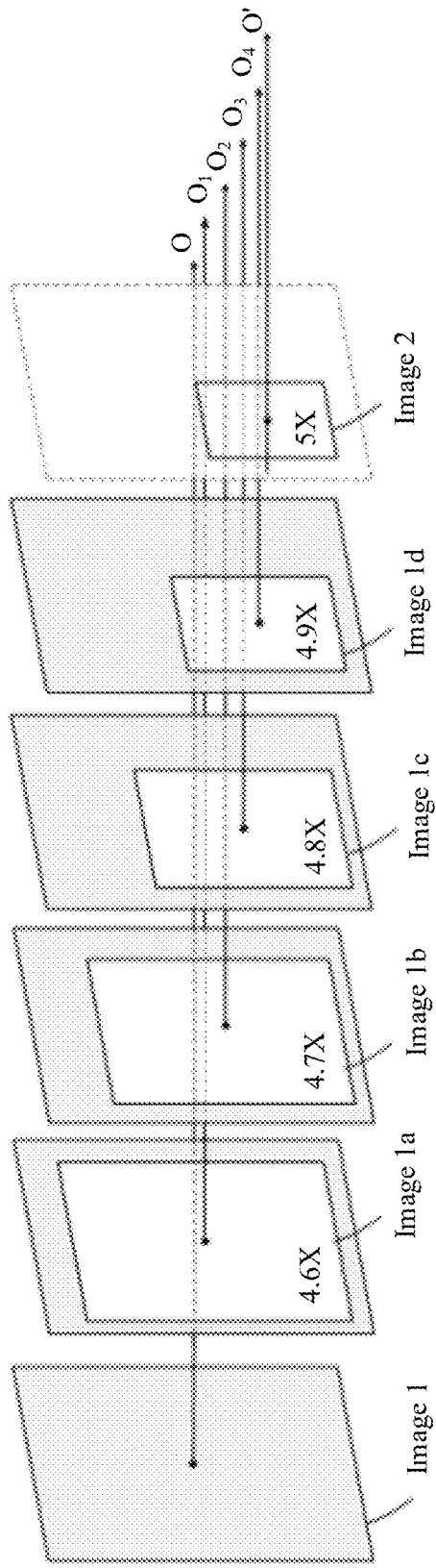

As shown in FIG. 8C, an image 1 is an image captured by the ordinary camera, an image 1a, an image 1b, an image 1c, and an image id are respectively displayed images obtained after the electronic device performs eccentric cropping when the zoom ratio is 4.6×, 4.7×, 4.8×, and 4.9×, and an image 2 is an image captured by the long-focus camera.

(1) A Zoom Ratio Increases.

It is assumed that the zoom ratio presents a gradual increase change of 4.6×, 4.7×, 4.8×, and 4.9×. After the electronic device performs eccentric cropping, the image 1a, the image 1b, the image 1c, and the image id are sequentially displayed. In this case, FOV centers of the displayed images are respectively $O_1$, $O_2$, $O_3$, and $O_4$.

It can be learned that positions of the four center points $O_1$ to $O_4$ present a change of gradually moving, and a moving direction points to an FOV center of the image 2, that is, a point O'. Such cropping performed at a plurality of adjacent zoom ratios is incremental eccentric cropping.

(2) A Zoom Ratio Decreases.

It is assumed that the zoom ratio presents a gradual decrease change of 4.9×, 4.8×, 4.7×, and 4.6×. After the electronic device performs eccentric cropping, the image id, the image 1c, the image 1b, and the image 1a are sequentially displayed. In this case, FOV centers of the displayed images are respectively $O_4$, $O_3$, $O_2$, and $O_1$.

It can be learned that positions of the four center points $O_4$ to $O_1$ present a change of gradually moving, and a moving direction points to an FOV center of the image 1, that is, a point O. Such cropping performed at a plurality of adjacent zoom ratios is incremental eccentric cropping.

It can be learned from (1) and (2) that, regardless of increasing or decreasing the zoom ratio, incremental eccentric cropping is performed at a plurality of zoom ratios near a zoom ratio for camera switching, so that FOV centers of a plurality of cropped images implement a gradual transition. In this way, an FOV center of a preview image does not jump in a zoom process.

It can be learned from the foregoing phase 1 to phase 4 that the imaging deviation between the long-focus camera 193-5 and the ordinary camera 193-3 is obtained through camera calibration, and then the cropping area of the ordinary camera 193-3 in a digital zoom process is changed by using the imaging deviation, to change the FOV center of the preview image, and implement a smooth transition of the FOV center. Therefore, by calibrating an imaging deviation between FOV centers of other cameras, a smooth transition of the FOV centers can also be implemented during switching between the other cameras.

In addition, incremental eccentric cropping provided in this embodiment of this application is performed at a zoom ratio from 4.6× to 4.9×. In some possible cases, incremental eccentric cropping may be applied to a larger zoom ratio range, for example, 4× to 4.9×, and a zoom ratio change interval is not limited to the foregoing 0.1×. In this way, when a quantity of eccentric cropping times increases, an amplitude at which the FOV center changes may be smaller, and the FOV center implements a smoother transition.

Figure 9:
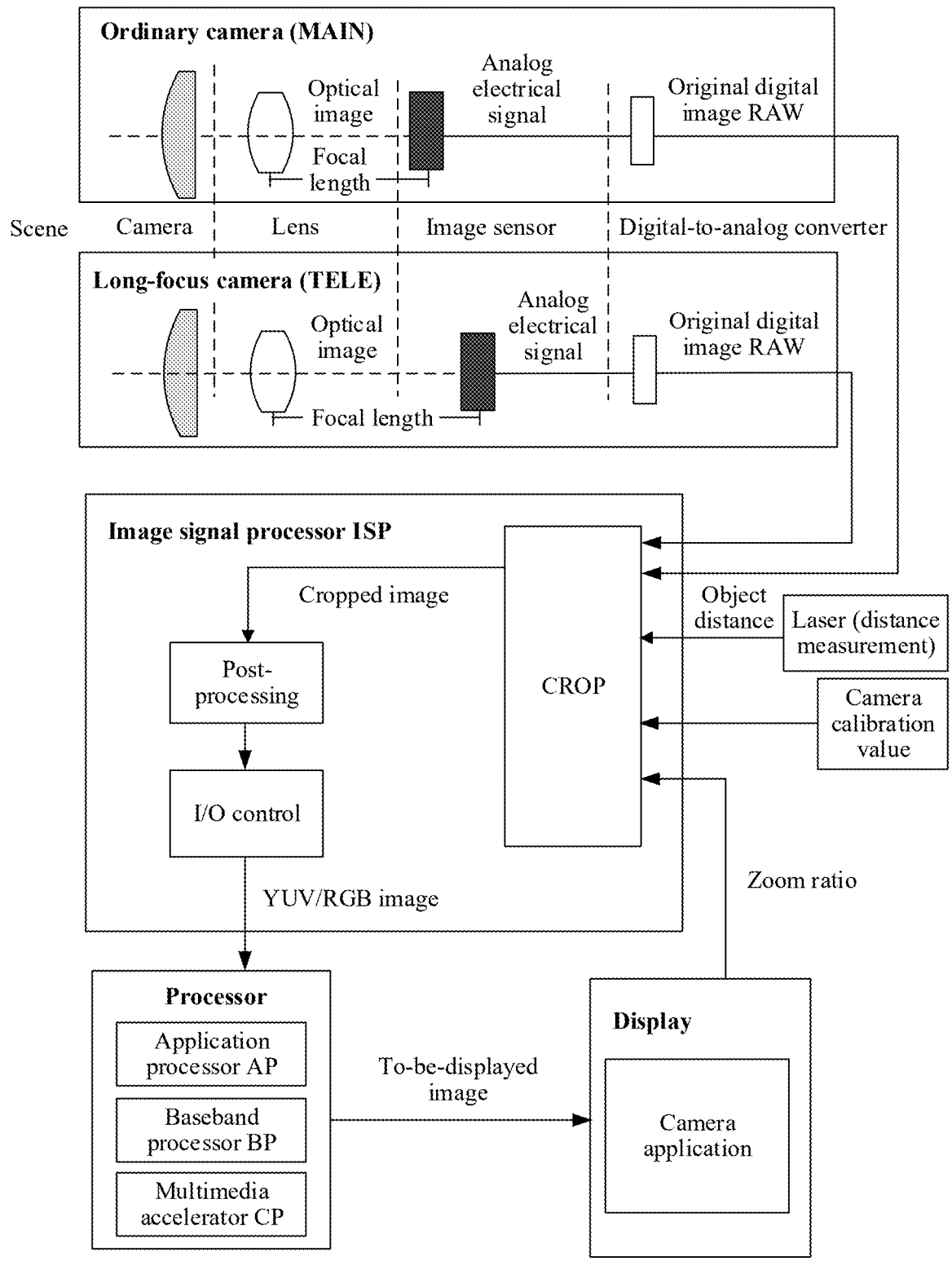
FIG. 9 shows a schematic diagram of collaboration of some software and hardware of an electronic device according to an embodiment of this application.

The following describes in detail specific implementation of the embodiments shown in FIG. 4A to FIG. 4H, FIG. 5A to FIG. 5H, FIG. 6A and FIG. 6B, and FIG. 7A to FIG. 7H from a perspective of software and hardware collaboration of the electronic device 100 with reference to FIG. 9.

As shown in FIG. 9, a camera is configured to capture an image. When reflected light of a scene passes through the camera and is refracted on a lens, the reflected light converges on an image sensor. The image sensor converts an optical image into an analog electrical signal. Then, a digital-to-analog converter outputs an original digital image captured by the camera.

An ISP is configured to convert data from the camera into an image in a standard format, for example, YUV or RGB. Specifically, the ISP uses a front-end CROP module to crop the image captured by the camera; then performs post-processing on a cropped image, for example, operations such as black level correction, lens shading correction, defect pixel compensation, and color interpolation; and then uses an I/O control interface to transmit the YUV/RGB image to a processor for processing.

The processor includes an application processor, a baseband processor, and a multimedia accelerator, and may run various image processing algorithms and control a peripheral device. In a preview scenario, an image that is in the YUV format and that is obtained by the ISP may be directly transmitted to a display for displaying. In a photographing or video recording scenario, a photo or a video may be stored in a memory.

The display may listen to, by using a UI, a user operation used to adjust a preview image in each area on the display, and report a detected user operation to the front-end CROP module of the ISP. The user operation may include but is not limited to a touch operation that is detected by the electronic device 100 in the preview box, that is performed on a target object, and that is mentioned in the foregoing UI embodiments.

In addition, a laser shown in FIG. 9 may be configured to measure a distance between a scene and the electronic device, that is, an object distance. The object distance may be used to select actual deviation values total_x and total_y from camera calibration values, where the camera calibration values are obtained through camera calibration. For a specific process of camera calibration, refer to the foregoing content. Details are not described herein.

(1) Specific Implementation of the Embodiment of FIG. 4A to FIG. 4H and the Embodiment of FIG. 5A to FIG. 5H First, specific implementation of the embodiment of increasing a zoom ratio shown in FIG. 4A to FIG. 4H is described.

In a preview scenario, the display displays a preview interface, where a preview box in the preview interface is used to display an image captured by the ordinary camera, and a zoom ratio displayed on the preview interface is 1×.

The display detects a user operation of increasing a zoom ratio, and transmits a zoom ratio selected by the user to the ISP, so that the CROP module in the ISP crops, based on the zoom ratio selected by the user, the image captured by the ordinary camera. If the zoom ratio is increased to be close to 5×, for example, 4.6×, eccentric cropping is performed. That is, the ISP determines a position and a size of a cropping area based on the zoom ratio, an object distance, and a camera calibration value, and performs eccentric cropping on the image captured by the ordinary camera. When the zoom ratio is increased to 5×, the ISP processes an image captured by the long-focus camera.

The ISP performs further post-processing such as black level correction and lens shading correction on a cropped image, and then transmits the cropped image to the processor to generate a to-be-displayed image.

The processor then transmits the to-be-displayed image to the display, to indicate the display to display the to-be-displayed image in the preview box.

Then, specific implementation of the embodiment of decreasing a zoom ratio shown in FIG. 5A to FIG. 5H is described.

In a preview scenario, the display displays a preview interface, where a preview box in the preview interface is used to display an image captured by the long-focus camera, and a zoom ratio displayed on the preview interface is 5×.

The display detects a user operation of decreasing a zoom ratio, and transmits a zoom ratio selected by the user to the ISP. The CROP module in the ISP obtains an image captured by the ordinary camera, obtains a position and a size of a cropping area with reference to the zoom ratio selected by the user, an object distance, and a camera calibration value, and performs eccentric cropping on the image captured by the ordinary camera.

The ISP performs further post-processing such as black level correction and lens shading correction on a cropped image, and then transmits the cropped image to the processor to generate a to-be-displayed image.

The processor then transmits the to-be-displayed image to the display, to indicate the display to display the to-be-displayed image in the preview box.

That is, in a process of increasing or decreasing a zoom ratio, the electronic device may perform, by using the CROP module in the ISP, incremental eccentric cropping on the image captured by the ordinary camera, to gradually increase or decrease a preview angle, and change an FOV center of a displayed image.

(2) Specific Implementation of FIG. 6A and FIG. 6B

In a photographing scenario, for specific implementation of user interaction for changing (increasing or decreasing) a zoom ratio and specific implementation of incremental eccentric cropping, refer to the foregoing content in (1). A difference lies in that in the photographing scenario, the display may further detect a photographing operation, and in response to the operation, the electronic device stores, as a photo, a picture displayed in the preview box.

Specifically, after a photographing preview is started, the display can detect a touch operation on a photographing control, in addition to a zoom ratio adjustment operation. In this case, the electronic device stores an image that is output by the ISP to the preview interface of the display when the touch operation is detected, that is, the ISP further encodes and compresses obtained data in the YUV format into a photo in a JPEG format. Then, the processor stores the photo in the memory.

(3) Specific Implementation of FIG. 7A to FIG. 7H

In a video recording scenario, for specific implementation of user interaction for changing (increasing or decreasing) a zoom ratio and specific implementation of incremental eccentric cropping, refer to the foregoing content in (1). A difference lies in that in the video recording scenario, the electronic device further needs to store an image in the preview box, and specifically stores the image as a video file.

Specifically, after entering a video recording interface, the display can detect two touch operations on a video recording control, in addition to a zoom ratio adjustment operation. In this case, the electronic device stores image frames that are output in a time period between the two touch operations, that is, the N image frames are transmitted to a video encoder for encoding and then stored as a file, that is, a video generated in a video recording mode. Then, the processor stores the generated video in the memory.

An embodiment of this application further provides a photographing method. In the method, an electronic device may reduce an FOV center jump of an image by moving a lens by using an OIS image stabilization motor.

Figure 10:
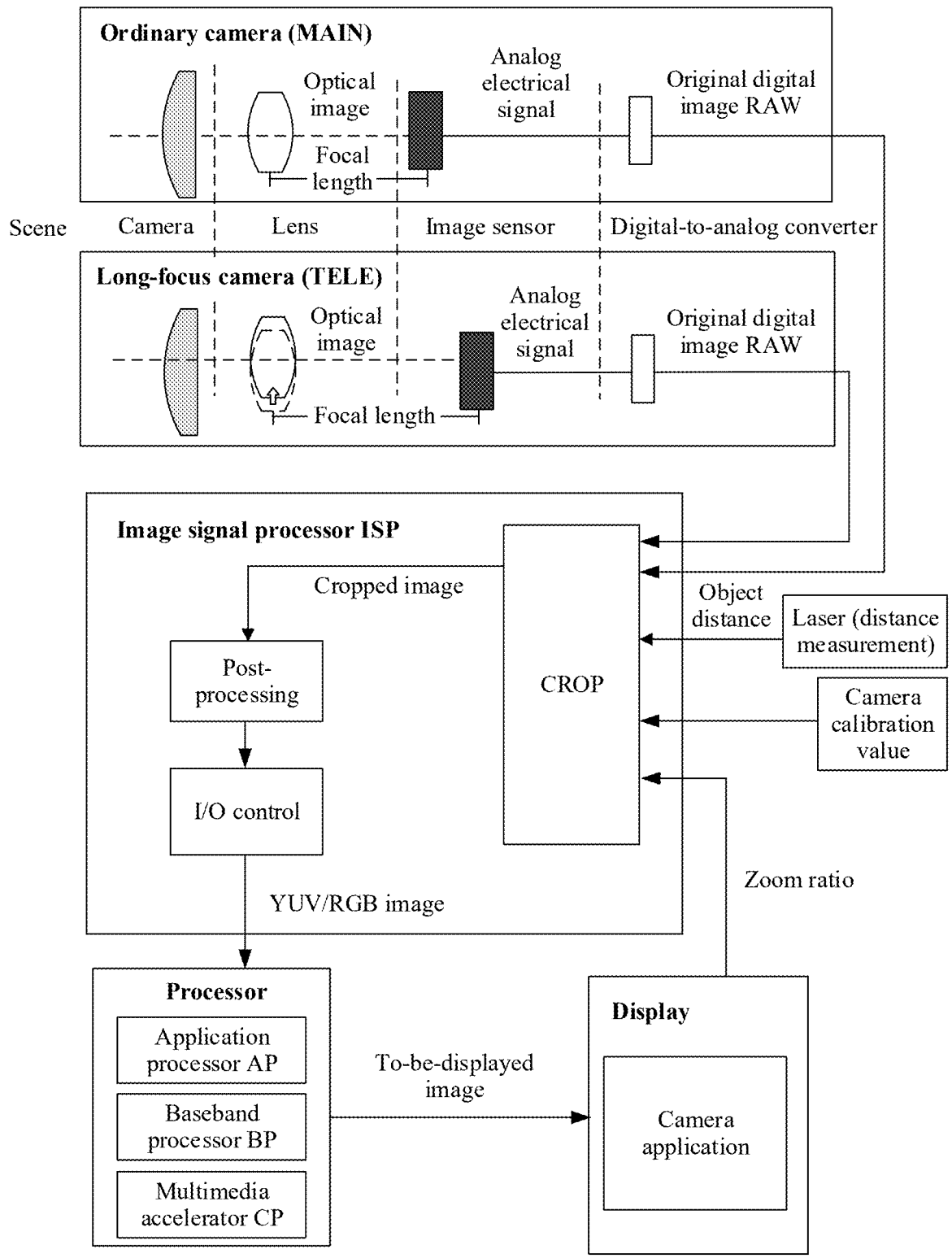
FIG. 10 shows another schematic diagram of collaboration of some software and hardware of an electronic device according to an embodiment of this application.

The following describes, with reference to FIG. 10, how software and hardware of the electronic device 100 in this embodiment of this application collaborate to perform a zoom process with an OIS function provided in this embodiment of this application.

For the zoom process with the OIS function, an effect of moving a lens in the OIS function may be used to change an optical center position of a camera, to change an FOV center of the camera, thereby shortening an FOV center difference between two cameras.

For example, when a zoom ratio is gradually increased or decreased to be close to a zoom ratio for switching between an ordinary camera 193-3 and a long-focus camera 193-5, the OIS image stabilization function may not be enabled temporarily. As shown in FIG. 10, the OIS image stabilization motor is used to move a lens in the long-focus camera 193-5, so that an optical center of the long-focus camera 193-5 approaches an optical center of the ordinary camera 193-3. In this way, a deviation between the FOV centers of the long-focus camera 193-5 and the ordinary camera 193-3 is reduced. The OIS image stabilization function is enabled after camera switching is completed. The electronic device may alternatively move a lens in the ordinary camera 193-3 by using the OIS image stabilization motor, so that the optical center of the ordinary camera 193-3 approaches the optical center of the long-focus camera 193-5, to reduce an offset between the optical centers of the two cameras. In this way, a jump of an image in a switching process can also be reduced by reducing the offset between the optical centers of the two cameras.

In other words, near the zoom ratio for camera switching, the electronic device may drive, by using a motor of an optical image stabilization OIS system, the lens of the long-focus camera 193-5 to move or the lens of the ordinary camera 193-3 to move. As the lens moves, the offset between the optical center of the long-focus camera 193-5 and the optical center of the ordinary camera 193-3 gradually increases or decreases. In a first ratio range, a smaller zoom ratio leads to a larger offset, and a larger zoom ratio leads to a smaller offset. Regardless of whether the offset increases or decreases as the lens moves, the offset is less than an initial offset between the optical center of the long-focus camera 193-5 and the optical center of the ordinary camera 193-3.

Specifically, near the zoom ratio for camera switching, if the zoom ratio gradually increases, the electronic device may drive, by using the motor of the OIS, the lens of the long-focus camera 193-5 to move in a direction that is perpendicular to an optical axis and toward the ordinary camera 193-3, or may drive the lens of the ordinary camera 193-3 to move in a direction that is perpendicular to the optical axis and toward the long-focus camera 193-5. The offset between the two optical centers gradually decreases with the movement.

Specifically, near the zoom ratio for camera switching, if the zoom ratio gradually decreases, the electronic device may drive, by using the motor of the OIS, the lens of the long-focus camera 193-5 to move in a direction that is perpendicular to the optical axis and away from the ordinary camera 193-3, or may drive the lens of the ordinary camera 193-3 to move in a direction that is perpendicular to the optical axis and away from the long-focus camera 193-5. The offset between the two optical centers gradually increases with the movement.

In some embodiments, the zoom process with the OIS function and a zoom process of eccentric cropping may be combined to implement a zoom process. Specifically, in a process of increasing a zoom ratio, when the zoom ratio increases to 4.6×, an image captured by the ordinary camera 193-3 is cropped in an eccentric cropping manner, to achieve an effect that an image center of a displayed image gradually approaches the FOV center of the long-focus camera 193-5. When the zoom ratio increases from 4.9× to 5×, the optical center of the long-focus camera 193-5 is moved by using the OIS motor, so that the optical center of the long-focus camera 193-5 is close to or fixed at the image center of the displayed image. That is, the FOV center of the long-focus camera 193-5 is moved, so that a smooth transition of an FOV center of the image is implemented in a camera switching process.

That is, there may be two phases near the zoom ratio for camera switching. In a first phase, at a zoom ratio closest to the zoom ratio for switching, for example, at 4.9× to 5×, the OIS image stabilization motor is used to drive a lens to move, so that an FOV center of a camera having a smaller FOV approaches an FOV center of a camera having a larger FOV. In a second phase, at a zoom ratio other than the zoom ratio in the first phase, for example, at 4.6× to 4.8×, an incremental eccentric cropping method is used to perform eccentric cropping on an image captured by the camera having a larger FOV.

Based on the electronic device 100 and the UI embodiments described in the foregoing content, an overall procedure of the photographing method provided in this embodiment of this application may be as follows:

Phase 1 (S101 and S102): Opening a Photographing Preview Interface

S101: The electronic device 100 starts a camera application.

For example, the electronic device 100 may detect a touch operation performed on the camera icon 215D shown in FIG. 3A (for example, a tap operation on the icon 215D), and start the camera application in response to the operation.

S102: The electronic device 100 displays a preview interface, where the preview interface displays a first image that is from a first camera.

Specifically, the first camera may be an ordinary camera, and a zoom ratio of the ordinary camera may be 1×; or the first camera may be a long-focus camera, and a zoom ratio of the long-focus camera may be 5×.

Phase 2 (S103 to S106): Changing a Zoom Ratio

S103: The electronic device 100 detects a user operation of changing the zoom ratio by a user, and changes the zoom ratio in response to the operation.

The user operation is an operation performed by the user on a screen of the electronic device, for example, an interface operation of pinching or stretching with two fingers of the user.

S104: The electronic device displays a second image that is from a second camera on the preview interface.

The second camera may be an ordinary camera or a long-focus camera. However, an FOV of the second image is different from an FOV of the first image, and an FOV center of the second image is different from an FOV center of the first image.

In addition, there may be M second images. Specifically, angles of view of the second images displayed on the preview interface may gradually change (increase or decrease). M is a positive integer greater than or equal to 2.

S105: The electronic device 100 detects a user operation of continuing to change the zoom ratio by the user, and changes the zoom ratio in response to the operation.

S106: The electronic device 100 displays a third image that is from a third camera on the preview interface.

The third camera may be an ordinary camera or a long-focus camera. However, an FOV of the third image is different from the FOV of the first image and the FOV of the second image, and the FOV center of the second image is between the FOV center of the first image and an FOV center of the second image. In addition, FOV centers of the M second images gradually approach the FOV center of the third image and gradually get away from the FOV center of the first image.

The changing a zoom ratio includes two cases: increasing a zoom ratio and decreasing a zoom ratio. In the two different cases, specific cases of the first camera, the second camera, and the third camera are different, and specific cases of the first image, the second image, and the third image are also different. The following separately describes specific cases of steps S101 to S106 with reference to the embodiment shown in FIG. 4A to FIG. 4D and the embodiment shown in FIG. 5A to FIG. 5D.

Case 1: Increasing a Zoom Ratio

As shown in FIG. 4A to FIG. 4D, the electronic device may detect an operation of increasing the zoom ratio. In response to the operation, the electronic device may decrease an FOV presented by an image displayed on the preview interface. When the zoom ratio increases to 5×, the electronic device may display, in the preview box 306, an image captured by the long-focus camera, that is, the image on the preview interface is switched to an image that is from the long-focus camera.

In addition to decreasing the FOV of the preview image, as shown in FIG. 4B to FIG. 4D, once the zoom ratio is increased to be close to the zoom ratio 5× of the long-focus camera 193-5, for example, when the zoom ratio 307 is "4.7×" or "4.9×" shown in the figure, the electronic device may further move an FOV center of the preview image toward an FOV center of the long-focus camera, instead of directly jumping from an FOV center of the ordinary camera to the FOV center of the long-focus camera 193-5. In addition, if an increased zoom ratio is closer to the zoom ratio 5× of the long-focus camera, the FOV center of the preview image at the increased zoom ratio is closer to the FOV center of the long-focus camera.

Herein, that the zoom ratio is increased to be close to the zoom ratio 5× of the long-focus camera 193-5 may mean that the zoom ratio is less than 5×, and a difference between the zoom ratio and 5× is less than a specific value, for example, 0.5×.

In this case, as shown in FIG. 4A, the first image is displayed in the preview box, and in this case, the first camera is the ordinary camera. As shown in FIG. 4B and FIG. 4C, the user operation 300A is the user operation mentioned in S103 and S105, the second image is displayed on the preview interface, and in this case, the second camera is the ordinary camera. As shown in FIG. 4D, the third image is displayed on the preview interface, and in this case, the third camera is the long-focus camera.

That is, when the zoom ratio is increased, the first camera and the second camera are a same camera and are the ordinary camera, and the third camera is different from the first camera and the second camera and is the long-focus camera. The FOVs of the first image, the second image, and the third image gradually decrease. The FOV center of the first image may be the FOV center of the ordinary camera, and the FOV center of the third image may be the FOV center of the long-focus camera.

Case 2: Decreasing a Zoom Ratio

As shown in FIG. 5A to FIG. 5D, the electronic device may detect an operation of decreasing the zoom ratio. In response to the operation, the electronic device may increase an FOV presented by an image displayed on the preview interface. When the zoom ratio decreases to 4.9×, the electronic device may display, in the preview box 306, an image captured by the ordinary camera, that is, the image on the preview interface is switched to an image that is from the ordinary camera.

In addition to decreasing the FOV of the preview image, as shown in FIG. 5B to FIG. 5D, once the zoom ratio is decreased to be close to the zoom ratio 5× of the long-focus camera 193-5 and less than 5×, for example, when the zoom ratio 307 is "4.9×" or "4.7×" shown in the figure, the electronic device may further move an FOV center of the preview image in a direction of getting away from an FOV center of the long-focus camera and approaching an FOV center of the ordinary camera, instead of directly jumping from the FOV center of the long-focus camera to the FOV center of the ordinary camera. In addition, near the zoom ratio 5× of the long-focus camera, a smaller zoom ratio indicates that the FOV center of the preview image at the zoom ratio is farther away from the FOV center of the long-focus camera and closer to the FOV center of the ordinary camera.

Herein, that the zoom ratio is decreased to be close to the zoom ratio 5× of the long-focus camera 193-5 and less than 5× may mean that the zoom ratio is less than 5×, and a difference between the zoom ratio and 5× is less than a specific value, for example, 0.5×.

In this case, as shown in FIG. 5A, the first image is displayed in the preview box, and in this case, the first camera is the long-focus camera. As shown in FIG. 5B and FIG. 5C, the user operation 300B is the user operation mentioned in S103 and S105, the second image is displayed on the preview interface, and in this case, the second camera is the ordinary camera. As shown in FIG. 5D, the third image is displayed on the preview interface, and in this case, the third camera is the ordinary camera.

That is, when the zoom ratio is decreased, the first camera is the long-focus camera, and the second camera and the third camera are the same but different from the first camera, and are the ordinary camera. The FOVs of the first image, the second image, and the third image gradually decrease. The FOV center of the first image may be the FOV center of the long-focus camera, and the FOV center of the third image may be the FOV center of the ordinary camera.

It can be learned from the case 1 and the case 2 that, compared with the ordinary camera, the long-focus camera is a camera having a smaller FOV. When extended to any two cameras whose FOVs are close to each other on the electronic device, the ordinary camera in the case 1 or the case 2 may be replaced with a camera having a larger FOV in the any two cameras whose FOVs are close to each other, and the long-focus camera may be replaced with a camera having a smaller FOV in the any two cameras whose FOVs are close to each other. For example, a long-focus camera and an ultra-long-focus camera may respectively replace the ordinary camera and the long-focus camera in the case 1 or the case 2.

The method for changing a zoom ratio in the foregoing steps S101 to S106 is also applicable to a photographing scenario and a video recording scenario. When the electronic device detects a user operation of photographing or video recording by the user, the electronic device stores, as a photo or a video, an image displayed on the preview interface.

As shown in FIG. 6A and FIG. 6B, the electronic device may detect a touch operation of the user for photographing. To be specific, in a preview process, the electronic device stores a picture in the preview box as a picture, in response to the photographing operation of the user. The user may observe a change of an FOV center by browsing pictures shot at different zoom ratios. For a specific implementation, refer to the UI embodiments of FIG. 5A to FIG. 5H and FIG. 6A and FIG. 6B.

As shown in FIG. 7A to FIG. 7H, in a video recording process, the electronic device 100 may also detect a user operation of changing a zoom ratio by the user, and therefore change a field of view in the video recording process. However, an image on the preview interface in the video recording process is a recorded image, and is to be stored as a video. For a specific implementation, refer to the UI embodiments of FIG. 7A to FIG. 7H.

For content that is not mentioned in the foregoing overall method procedure, refer to the foregoing UI embodiments. Details are not described herein.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A method of operating an electronic device comprising a screen, a first camera, and a second camera, wherein optical centers of the first camera and the second camera do not overlap, and a focal length of the first camera is less than a focal length of the second camera, the method comprising:
    detecting, by the electronic device, that a zoom ratio gradually changes within a first ratio range, wherein the zoom ratio in the first ratio range is less than an optical zoom ratio of the second camera, and a ratio difference between the zoom ratio within the first ratio range and the optical zoom ratio of the second camera is less than a first value;
    cropping an image captured by the first camera to obtain a preview image whose field of view (FOV) size gradually changes, wherein an FOV center of the preview image, whose FOV size gradually changes, gradually approaches or gets away from an FOV center of the second camera; and
    displaying, by the electronic device on the screen, the preview image whose FOV size gradually changes.

2. The method according to claim 1, wherein:
    in the first ratio range, a larger zoom ratio leads to a smaller FOV of the preview image, and indicates that the FOV center of the preview image is closer to the FOV center of the second camera; and
    in the first ratio range, a smaller zoom ratio leads to a larger FOV of the preview image, and indicates that the FOV center of the preview image is farther away from the FOV center of the second camera.

3. The method according to claim 1, wherein the zoom ratio changes within the first ratio range by gradually increasing in the first ratio range; and
    the FOV center of the preview image, whose FOV size gradually changes, gradually decreases and gradually approaches the FOV center of the second camera.

4. The method according to claim 3, further comprising:
    displaying, by the electronic device, a preview image of a first FOV on the screen before detecting that the zoom ratio gradually changes within the first ratio range, wherein the preview image of the first FOV is from the first camera, and a center of the first FOV is consistent with an FOV center of the first camera.

5. The method according to claim 3, further comprising:
    detecting, by the electronic device, that the zoom ratio increases to be greater than the optical zoom ratio of the second camera; and
    displaying a preview image of a second FOV on the screen, wherein the preview image of the second FOV is from the second camera, and a center of the second FOV is consistent with the FOV center of the second camera.

6. The method according to claim 1, wherein the zoom ratio changes within the first ratio range by gradually decreasing in the first ratio range; and
    the FOV center of the preview image, whose FOV size gradually changes, gradually increases and gradually gets away from the FOV center of the second camera.

7. The method according to claim 6, further comprising:
displaying, by the electronic device, a preview image of a third FOV on the screen before detecting that the zoom ratio gradually changes within the first ratio range, wherein the preview image of the third FOV is from the second camera, and a center of the third FOV is consistent with the FOV center of the second camera.

8. The method according to claim 6, further comprising:
    detecting, by the electronic device, that the zoom ratio decreases to be less than a minimum ratio in the first ratio range; and
    displaying a preview image of a fourth FOV on the screen, wherein the preview image of the fourth FOV is from the first camera, and a center of the fourth FOV is consistent with an FOV center of the first camera.

9. The method according to claim 1, wherein
cropping the image captured by the first camera comprises determining a position of a cropping area based on the zoom ratio, an imaging deviation offset at a first distance, and an eccentric factor $\alpha$ at the zoom ratio; and
    the first distance is a detected distance between the electronic device and a scene, the imaging deviation at the first distance comprises a first deviation and a second deviation, and the first deviation and the second deviation are respectively deviations of a center of the image captured by the first camera relative to a center of an image captured by the second camera in an X-axis direction and a Y-axis direction of an image coordinate system; and in the first ratio range, a larger zoom ratio leads to a larger eccentric factor, a smaller zoom ratio leads to a smaller eccentric factor α; and the eccentric factor is greater than 0 and less than 1.

10. The method according to claim 9, wherein on a plane of the image captured by the first camera, an X-coordinate value and a Y-coordinate value of an upper-left corner of the cropping area are determined as follows:

X-coordinate value=$(1-1/R)*w/2+total\_x*\alpha$; and
Y-coordinate value=$(1-1/R)*h/2+total\_y*\alpha$, wherein R is the zoom ratio, total_x is the first deviation, total_y is the second deviation, a is the eccentric factor, and w and h are respectively a width and a height of the image captured by the first camera.

11. The method according to claim 1, wherein the method further comprises:
driving a motor of an optical image stabilization (OIS) system to move a lens of the first camera or a lens of the second camera in the first ratio range, wherein:
an offset between the optical center of the second camera and the optical center of the first camera gradually increases or decreases as the lens of the first camera moves, and the offset is less than an initial offset between the optical centers of the first camera and the second camera, and
in the first ratio range, a smaller zoom ratio leads to a larger offset, and a larger zoom ratio leads to a smaller offset.

12. The method according to claim 11, wherein:
the zoom ratio changes within the first ratio range by gradually increasing in the first ratio range; and
driving the motor of the OIS system comprises:
driving the motor of the OIS system to move the lens of the second camera to move in a direction perpendicular to an optical axis and toward the first camera, or
driving the motor of the OIS system to move the lens of the first camera to move in a direction perpendicular to the optical axis and toward the second camera, wherein the offset between the optical center of the second camera and the optical center of the first camera gradually decreases with a movement of the lens of the first camera or the lens of the second camera.

13. The method according to claim 11, wherein:
the zoom ratio changes within the first ratio range by gradually decreasing in the first ratio range; and
driving the motor of the OIS system comprises:
driving the motor of the OIS system to move the lens of the second camera to move in a direction perpendicular to an optical axis and away from the first camera, or
driving the motor of the OIS system to move the lens of the first camera to move in a direction perpendicular to the optical axis and away from the second camera, wherein the offset between the optical center of the second camera and the optical center of the first camera gradually increases with a movement of the lens of the first camera or the lens of the second camera.

14. The method according to claim 1, wherein cropping the image captured by the first camera comprises performing eccentric cropping, wherein the eccentric cropping shifts a center of a cropping area away from a center of the image captured by the first camera.

15. An electronic device, comprising:
a screen;
a first camera;
a second camera, wherein optical centers of the first camera and the second camera do not overlap, and a focal length of the first camera is less than a focal length of the second camera;
a processor coupled to the screen, the first camera and the second camera; and
a memory operatively coupled to the processor with instructions stored therein, wherein the instructions, when executed by the processor, cause the processor to:
detect that a zoom ratio gradually changes within a first ratio range, wherein the zoom ratio in the first ratio range is less than an optical zoom ratio of the second camera, and a ratio difference between the zoom ratio within the first ratio range and the optical zoom ratio of the second camera is less than a first value,
crop an image captured by the first camera to obtain a preview image whose field of view (FOV) size gradually changes, wherein an FOV center of the preview image, whose FOV size gradually changes, gradually approaches or gets away from an FOV center of the second camera, and display the preview image whose FOV size gradually changes.

16. The electronic device according to claim 15, wherein the zoom ratio changes within the first ratio range by gradually increasing in the first ratio range; and
the FOV center of the preview image, whose FOV size gradually changes, gradually decreases and gradually approaches the FOV center of the second camera.

17. The electronic device according to claim 15, wherein the zoom ratio changes within the first ratio range by gradually decreasing in the first ratio range; and
the FOV center of the preview image, whose FOV size gradually changes, gradually increases and gradually gets away from the FOV center of the second camera.

18. The electronic device according to claim 15, further comprising:
an optical image stabilization (OIS) system comprising a motor coupled to a lens of the first camera or a lens of the second camera, wherein:
the instructions, when executed by the processor, further cause the processor to cause the motor to move the lens of the first camera or the lens of the second camera,
an offset between the optical center of the second camera and the optical center of the first camera gradually increases or decreases as the lens of the first camera moves, and the offset is less than an initial offset between the optical centers of the first camera and the second camera, and
in the first ratio range, a smaller zoom ratio leads to a larger offset, and a larger zoom ratio leads to a smaller offset.

19. The electronic device according to claim 18, wherein:
the zoom ratio changes within the first ratio range by gradually increasing in the first ratio range; and
the instructions, when executed by the processor, further cause the processor to:

drive the motor of the OIS system to move the lens of the second camera to move in a direction perpendicular to an optical axis and toward the first camera, or drive the motor of the OIS system to move the lens of the first camera to move in the direction perpendicular to the optical axis and toward the second camera, wherein the offset between the optical center of the second camera and the optical center of the first camera gradually decreases with a movement of the lens of the first camera or the lens of the second camera.

20. The electronic device according to claim 18, wherein:
the zoom ratio changes within the first ratio range by gradually decreasing in the first ratio range; and
the instructions, when executed by the processor, further cause the processor to:
drive the motor of the OIS system to move the lens of the second camera to move in a direction perpendicular to an optical axis and away from the first camera, or drive the motor of the OIS system to move the lens of the first camera to move in the direction perpendicular to the optical axis and away from the second camera, wherein the offset between the optical center of the second camera and the optical center of the first camera gradually increases with a movement of the lens of the first camera or the lens of the second camera.

21. A non-transitory computer-readable storage medium with instructions stored therein, wherein, when the instructions are executed by a processor, the processor is enabled to perform:
detect that a zoom ratio of a first camera or a second camera gradually changes within a first ratio range, wherein the zoom ratio in the first ratio range is less than an optical zoom ratio of the second camera, and a ratio difference between the zoom ratio within the first ratio range and the optical zoom ratio of the second camera is less than a first value, wherein optical centers of the first camera and the second camera do not overlap, and a focal length of the first camera is less than a focal length of the second camera;
crop an image captured by the first camera to obtain a preview image whose field of view (FOV) size gradually changes, wherein an FOV center of the preview image, whose FOV size gradually changes, gradually approaches or gets away from an FOV center of the second camera; and
cause the preview image whose FOV size gradually changes to be displayed.

22. The non-transitory computer-readable storage medium of claim 21, wherein when the instructions are executed by the processor, the processor is further enabled to perform:
cause a motor of an optical image stabilization (OIS) system to move a lens of the first camera or a lens of the second camera, wherein
an offset between the optical center of the second camera and the optical center of the first camera gradually increases or decreases as the lens of the first camera moves, and the offset is less than an initial offset between the optical centers of the first camera and the second camera, and
in the first ratio range, a smaller zoom ratio leads to a larger offset, and a larger zoom ratio leads to a smaller offset.

* * * * *

UNITED STATES PATENT AND TRADEMARK OFFICE
CERTIFICATE OF CORRECTION

| | | |
|---|---|---|
| PATENT NO. | : 12,452,523 B2 | Page 1 of 1 |
| APPLICATION NO. | : 18/253551 | |
| DATED | : October 21, 2025 | |
| INVENTOR(S) | : Cui et al. | |

It is certified that error appears in the above-identified patent and that said Letters Patent is hereby corrected as shown below:

In the Claims

In Column 33, in Claim 10, Line 19, delete "a is the" and insert -- α is the --.

Signed and Sealed this
Thirtieth Day of December, 2025

John A. Squires
*Director of the United States Patent and Trademark Office*